(12) United States Patent
Murata

(10) Patent No.: US 9,482,309 B2
(45) Date of Patent: Nov. 1, 2016

(54) VEHICULAR VIBRATION REDUCTION APPARATUS

(75) Inventor: Kiyohito Murata, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/346,816

(22) PCT Filed: Oct. 5, 2011

(86) PCT No.: PCT/JP2011/073009
§ 371 (c)(1),
(2), (4) Date: Mar. 24, 2014

(87) PCT Pub. No.: WO2013/051119
PCT Pub. Date: Apr. 11, 2013

(65) Prior Publication Data
US 2014/0224060 A1    Aug. 14, 2014

(51) Int. Cl.
*F16H 57/028* (2012.01)
*F16F 15/12* (2006.01)
(Continued)

(52) U.S. Cl.
CPC ........... *F16F 15/315* (2013.01); *F16F 15/126* (2013.01); *F16F 15/145* (2013.01); *F16F 15/1464* (2013.01); *F16F 15/30* (2013.01); *F16H 57/0006* (2013.01); *F16F 2222/08* (2013.01); *F16F 2232/02* (2013.01); *F16H 2057/0012* (2013.01); *Y02T 10/6204* (2013.01); *Y10T 74/2131* (2015.01)

(58) Field of Classification Search
CPC ..................... F16H 57/006; F16H 2057/0012; F16F 15/1464; F16F 15/1478; F16F 15/31
See application file for complete search history.

(56) References Cited

U.S. PATENT DOCUMENTS 4,676,121 A  *  6/1987  Kouno ......................... 74/433.5
2010/0151980 A1    6/2010  Bowman et al.
(Continued)

FOREIGN PATENT DOCUMENTS

| CN | 201633542 | 11/2010 |
|---|---|---|
| DE | 10 2008 031 956 | 2/2009 |
| JP | 2010-1905 | 1/2010 |
| WO | WO 2008/064638 | 6/2008 |

OTHER PUBLICATIONS

Machine translation of the description of WO 2008/064638 downloaded from epo.org on Feb. 12, 2016.*

*Primary Examiner* — Richard Lorence
(74) *Attorney, Agent, or Firm* — Finnegan, Henderson, Farabow, Garrett & Dunner, LLP

(57) ABSTRACT

A vehicle vibration reduction apparatus (1) includes: an inertial mass body (30) that is connected to a rotary shaft (13) of a power transmission apparatus (5) such that the inertial mass body (30) is capable of transmitting power, wherein the rotary shaft (13) of a power transmission apparatus (5) is capable of transmitting rotary power from a travel drive source (4) to a drive wheel (10) of a vehicle (2); and a switching apparatus (40) that is provided on a power transmission path between the rotary shaft (13) and the inertial mass body (30) and that is capable of switching between a first path (42) on which the rotary shaft (13) and the inertial mass body (30) are connected to each other via an elastic body (41), and a second path (43) on which the rotary shaft (13) and the inertial mass body (30) are connected to each other without passing through the elastic body (41). Thus, the vehicle vibration reduction apparatus (1) can reduce vibration appropriately.

6 Claims, 10 Drawing Sheets

(51) Int. Cl.
*F16F 15/31* (2006.01)
*F16F 15/315* (2006.01)
*F16F 15/14* (2006.01)
*F16H 57/00* (2012.01)
*F16F 15/126* (2006.01)
*F16F 15/30* (2006.01)

(56) References Cited

U.S. PATENT DOCUMENTS

2010/0193320 A1    8/2010  Kombowski et al.
2014/0202278 A1*   7/2014  Murata .................... 74/574.4
2014/0366682 A1*  12/2014  Murata .................... 74/572.2

* cited by examiner

VEHICULAR VIBRATION REDUCTION APPARATUS

CROSS-REFERENCE TO RELATED APPLICATIONS

This application is a national phase application of International Application No. PCT/JP2011/073009, filed Oct. 5, 2011, the content of which is incorporated herein by reference.

TECHNICAL FIELD

The invention relates to a vehicle vibration reduction apparatus.

BACKGROUND ART

Patent Document 1, for example, discloses, as an apparatus that is installed in a vehicle in order to reduce vibration occurring in the vehicle, a drive system rotation variation reduction apparatus that reduces rotation variation in a drive system including an internal combustion engine, a transmission shaft that transmits an output torque of the internal combustion engine to a drive wheel of the vehicle, and a transmission provided on the transmission shaft. The drive system rotation variation reduction apparatus includes varying means for allowing an inertia of the transmission shaft to vary, and control means for controlling the varying means. In the drive system rotation variation reduction apparatus, a damper that absorbs variation in the output torque is provided on the transmission shaft further toward the internal combustion engine side than the transmission, and the varying means allow the inertia of the transmission shaft to vary on the transmission side of the damper. By increasing the inertia of the transmission shaft on the transmission side of the damper in this manner, the drive system rotation variation reduction apparatus can increase the inertia of the transmission shaft while suppressing a reduction in a mode frequency having a primary eigenvalue when the drive system is in a torsional vibration mode. As a result, the drive system rotation variation reduction apparatus can reduce rotation variation in the drive system while suppressing a reduction in vehicle responsiveness.

Patent Document 1: Japanese Patent Application Publication No. 2010-001905

SUMMARY OF THE INVENTION

Incidentally, there is further room for improvement in the drive system rotation variation reduction apparatus described in Patent Document 1 in terms of reducing vibration more appropriately and so on, for example.

The invention has been designed in consideration of the circumstances described above, and an object thereof is to provide a vehicle vibration reduction apparatus that can reduce vibration appropriately.

To achieve the object described above, a vehicle vibration reduction apparatus according to the invention includes: an inertial mass body that is connected to a rotary shaft of a power transmission apparatus such that the inertial mass body is capable of power transmission, wherein the power transmission apparatus is capable of transmitting rotary power from a travel drive source to a drive wheel of a vehicle; and a switching apparatus that is provided on a power transmission path between the rotary shaft and the inertial mass body and that is capable of switching between a first path on which the rotary shaft and the inertial mass body are connected to each other via an elastic body, and a second path on which the rotary shaft and the inertial mass body are connected to each other without passing through the elastic body.

Further, the vehicle vibration reduction apparatus described above may be configured such that the switching apparatus includes a connection releasing mechanism that is capable of releasing a connection between the rotary shaft and the inertial mass body.

Further, the vehicle vibration reduction apparatus described above may be configured such that the switching apparatus is capable of speed-shifting the rotary power transmitted to the inertial mass body on the first path or the second path at a plurality of speed ratios.

The vehicle vibration reduction apparatus described above may be configured to further include a variable inertial mass apparatus that controls an inertial mass of the inertial mass body variably.

Further, the vehicle vibration reduction apparatus described above may be configured such that the inertial mass body is capable of rotating coaxially with a rotary axis of the rotary shaft.

The vehicle vibration reduction apparatus described above may be configured to further include a control apparatus that controls switching between the first path and the second path by controlling the switching apparatus on the basis of an output rotation speed of the travel drive source.

With the vehicle vibration reduction apparatus according to the invention, vibration can be reduced appropriately.

MODES FOR CARRYING OUT THE INVENTION

Embodiments of the invention will be described in detail below on the basis of the drawings. Note that the invention is not limited to these embodiments. Further, constituent elements in the following embodiments include elements that could be replaced easily by persons skilled in the art or substantially identical elements.

First Embodiment

Figure 1:
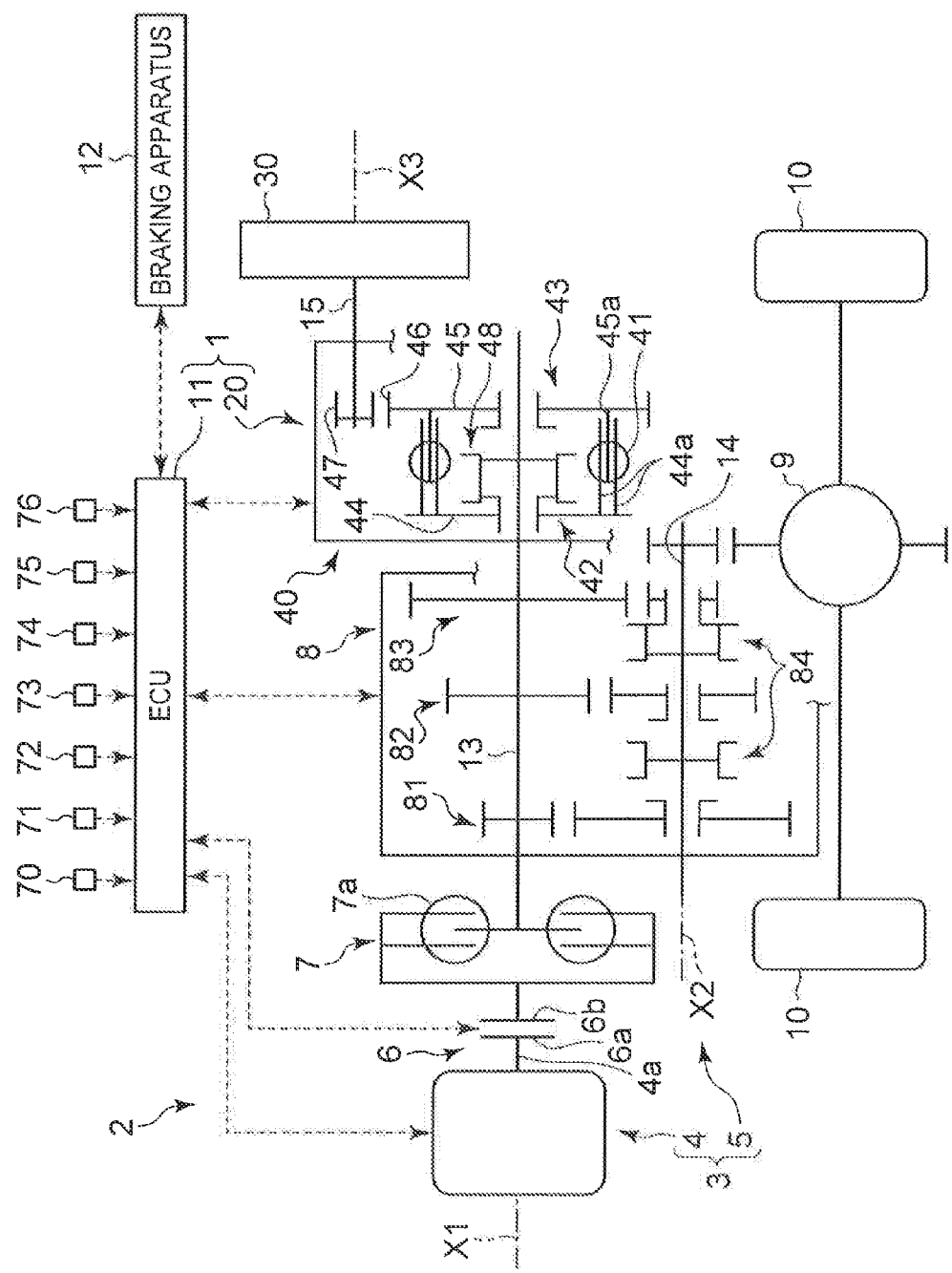
FIG. 1 is a schematic view showing a configuration of a vehicle vibration reduction apparatus according to a first embodiment.
Figure 2:
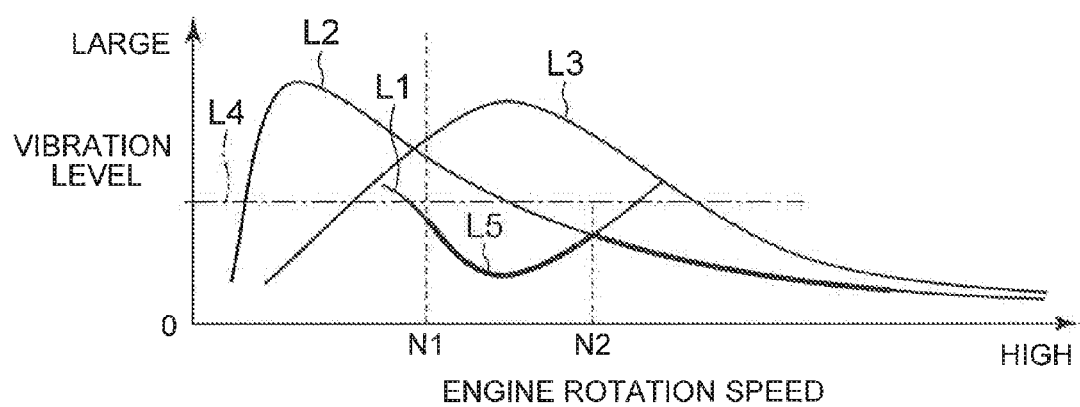
FIG. 2 is a diagram illustrating an example of an operation of the vehicle vibration reduction apparatus according to the first embodiment.

FIG. 1 is a schematic view showing a configuration of a vehicle vibration reduction apparatus according to a first embodiment, and FIG. 2 is a diagram illustrating an example of an operation of the vehicle vibration reduction apparatus according to the first embodiment.

Note that in the following description, unless noted otherwise, directions extending along rotary axes X1, X2, X3 respectively denote an axial direction, orthogonal directions to the rotary axes X1, X2, X3, or in other words orthogonal directions to the axial direction, respectively denote a radial direction, and directions about the rotary axes X1, X2, X3 respectively denote a circumferential direction. Further, in the radial direction, a rotary axis X1, X2, X3 side will be referred to as a radial direction inner side, and an opposite side will be referred to as a radial direction outer side.

As shown in FIG. 1, a vehicle vibration reduction apparatus 1 according to this embodiment is a noise-vibration-harshness (NVH) reduction apparatus that is applied to a vehicle 2 to reduce vibration occurring in the vehicle 2. The vehicle vibration reduction apparatus 1 includes a rotary body 30 serving as an inertial mass body. In the vehicle vibration reduction apparatus 1 according to this embodiment, the single rotary body 30 doubles as an inertial mass body of a resonance point adjustment apparatus that reduces an overall resonance frequency of a vibratory system by adjusting a resonance point (a resonance frequency) of a power train 3 of the vehicle 2, and an inertial mass body of a dynamic damper (a dynamic vibration absorber) that reduces vibration by applying vibration of an opposite phase to the resonance point of the power train 3 using an anti-resonance principle. Thus, with the vehicle vibration reduction apparatus 1, an improvement in a vibration reduction performance is achieved while suppressing an increase in the size of the apparatus.

Here, the vehicle vibration reduction apparatus 1 is configured to use the rotary body 30 separately as the resonance point adjusting inertial mass body and the dynamic damper inertial mass body by switching a power transmission path to the rotary body 30 appropriately. In other words, by appropriately switching the power transmission path to the rotary body 30, the vehicle vibration reduction apparatus 1 uses both a method of reducing NVH by adjusting the overall resonance point of the vibratory system and a method of reducing NVH by providing a dynamic damper in the vibratory system through which power is transmitted in order to apply vibration of an opposite phase.

Here, the power train 3 of the vehicle 2 includes an engine 4 constituted by an internal combustion engine serving as a travel drive source, a power transmission apparatus 5 capable of transmitting rotary power generated by the engine 4 to a drive wheel 10 from the engine 4, and so on. The power transmission apparatus 5 is configured to include a clutch 6, a damper 7, a torque converter not shown in the drawing, a main transmission 8, a differential gear 9, and so on. The power transmission apparatus 5 is capable of speed-shifting the rotary power from the engine 4 using the main transmission 8, for example, and transmitting the speed-shifted rotary power to the drive wheel 10 of the vehicle 2. The engine 4, the clutch 6, the main transmission 8, and so on are controlled by an electronic control unit (ECU) 11 serving as a control apparatus.

Hence, when a crankshaft 4a of the engine 4 is driven to rotate, resulting driving force is input into the main transmission 8 via the clutch 6, the damper 7, the torque converter not shown in the drawing, and so on, speed-shifted by the main transmission 8, and then transmitted to the respective drive wheels 10 via the differential gear 9 and so on such that the respective drive wheels 10 rotate, and as a result, the vehicle 2 can travel forward or in reverse. Further, the vehicle 2 is installed with a braking apparatus 12 that generates braking force in the vehicle 2 in response to a brake operation, or in other words a braking request operation, performed by a driver. The vehicle 2 can decelerate and stop using the braking force generated by the braking apparatus 12.

Here, the clutch 6 is provided in a power transmission system between the engine 4 and the drive wheels 10, and here between the engine 4 and the damper 7. Various clutches, for example a friction disc clutch apparatus such as a multiplate wet clutch or a single plate dry clutch, may be used as the clutch 6. Here, the clutch 6 is a hydraulic apparatus that is operated by a clutch oil pressure, i.e. an oil pressure of working oil, for example. The clutch 6 can be switched between an engaged condition in which the engine 4 and the drive wheels 10 are engaged to be capable of power transmission by engaging a rotary member 6a on the engine 4 side and a rotary member 6b on the drive wheel 10 side to be capable of power transmission, and a disengaged condition in which the engagement between the engine 4 and the drive wheels 10 is released. When the clutch 6 is in the engaged condition, the rotary member 6a and the rotary member 6b are connected such that power can be transmitted between the engine 4 and the drive wheels 10. When the clutch 6 is in the disengaged condition, on the other hand, the rotary member 6a and the rotary member 6b are disconnected such that power transmission between the engine 4 and the drive wheels 10 is blocked. When an engagement force by which the rotary member 6a and the rotary member 6b are engaged to each other is at zero, the engagement is released such that the clutch 6 enters the disengaged condition, and as the engagement force increases, the clutch 6 passes through a half engaged condition (a slip condition) and eventually reaches a fully engaged condition. Here, the rotary member 6a is a member that rotates integrally with the crankshaft 4a. The rotary member 6b, meanwhile, is a member that rotates integrally with a transmission input shaft 13 via the damper 7 and so on.

Further, the main transmission 8 modifies a speed ratio (a gear position) in accordance with a travel condition of the vehicle 2. The main transmission 8 is provided on the power transmission path from the engine 4 to the drive wheels 10 to be capable of speed-shifting and then outputting the rotary power transmitted from the engine 4 to the drive wheels 10. The power transmitted to the main transmission 8 is speed-shifted at a predetermined speed ratio (=input rotation speed/output rotation speed) by the main transmission 8 and then transmitted to the respective drive wheels 10. The main transmission 8 may be a so-called manual transmission (MT) or a so-called automatic transmission (AT) such as a stepped AT, a continuously variable transmission (CVT), a multimode manual transmission (MMT), a sequential manual transmission (SMT), or a dual clutch transmission (DCT). Here, for example, the main transmission 8 is a stepped AT, an operation of which is controlled by the ECU 11.

More specifically, the main transmission 8 speed-shifts the rotary power input into the transmission input shaft 13 from the engine 4 via the clutch 6, the damper 7, and so on, and outputs the speed-shifted rotary power from a transmission output shaft (an output shaft) 14. The transmission input shaft 13 is a rotary member of the main transmission 8 into which rotary power from the engine 4 side is input. The transmission output shaft 14 is a rotary member of the main transmission 8 that outputs rotary power to the drive wheel 10 side. The transmission input shaft 13 is capable of rotating about a rotary axis X1 when power from the engine 4 is transmitted thereto. The transmission output shaft 14 is capable of rotating about a rotary axis X2 that is parallel to the rotary axis X1 when the speed-shifted power from the engine 4 is transmitted thereto. The main transmission 8 has a plurality of gear positions 81, 82, 83 to which predetermined speed ratios are respectively allocated. In the main transmission 8, one of the plurality of gear positions 81, 82, 83 is selected using a speed change mechanism 84 constituted by a synchromesh mechanism or the like, whereupon the power input into the transmission input shaft 13 is speed-shifted in accordance with the selected gear position 81, 82, 83 and then output from the transmission output shaft 14 toward the drive wheel 10 side.

The ECU 11 is an electronic circuit having a conventional microcomputer including a central processing unit (CPU), a read only memory (ROM), a random access memory (RAM), and an interface as a main body. Electric signals corresponding to various detection results and the like are input into the ECU 11, whereupon the ECU 11 controls the engine 4, the clutch 6, the main transmission 8, the braking apparatus 12, and so on in accordance with the input detection results and the like. Here, the power transmission apparatus 5, including the main transmission 8 and so on, and the braking apparatus 12 are hydraulic apparatuses that operate using working oil pressure (oil pressure) as a medium. Accordingly, the ECU 11 controls operations thereof via an oil pressure control apparatus or the like. For example, the ECU 11 adjusts a throttle opening of an intake passage by controlling a throttle apparatus of the engine 4 on the basis of an accelerator depression amount, a vehicle speed, and so on, thereby adjusting an intake air amount. A fuel injection amount is controlled in accordance with variation in the intake air amount, whereby an amount of air-fuel mixture charged into a combustion chamber is adjusted. Thus, the ECU 11 controls an output of the engine 4. Further, for example, the ECU 11 controls an operating condition of the clutch 6 and the gear position (the speed ratio) of the main transmission 8 by controlling the oil pressure control apparatus on the basis of the accelerator depression amount, the vehicle speed, and so on.

The vehicle vibration reduction apparatus 1 according to this embodiment is provided in the power train 3 on a rotary shaft of the power transmission apparatus 5 that rotates when power is transmitted thereto from the engine 4, which is constituted here by the transmission input shaft 13 of the main transmission 8 forming a drive system. The transmission input shaft 13 is disposed such that the rotary axis X1 thereof is substantially parallel to a rotary axis X3 of a reduction apparatus rotary shaft 15, to be described below.

To reduce vibration appropriately, the vehicle vibration reduction apparatus 1 includes a vibration reduction apparatus main body 20 configured to include the rotary body 30, and the ECU 11 serving as a control apparatus that controls the vibration reduction apparatus main body 20. The vibration reduction apparatus main body 20 can modify a vibration reduction characteristic appropriately in accordance with an operating condition.

The vibration reduction apparatus main body 20 according to this embodiment includes the rotary body 30, which doubles as a resonance point adjusting inertial mass body and a dynamic damper inertial mass body, and a switching apparatus 40. The rotary body 30 is provided parallel to the power transmission path of the power transmission apparatus 5 extending from the engine 4 to the drive wheels 10, and is connected to the transmission input shaft 13 to be capable of power transmission. The switching apparatus 40 is provided on the power transmission path between the rotary body 30 and the transmission input shaft 13, and is capable of switching between a first path 42 on which the transmission input shaft 13 and the rotary body 30 are connected via a spring 41 serving as an elastic body, and a second path 43 on which the transmission input shaft 13 and the rotary body 30 are connected without passing through the spring 41. Hence, by appropriately switching the power transmission path to the rotary body 30, the vehicle vibration reduction apparatus 1 can use the rotary body 30 separately as a resonance point adjusting inertial mass body or a dynamic damper inertial mass body.

More specifically, the vibration reduction apparatus main body 20 according to this embodiment includes the reduction apparatus rotary shaft 15, the rotary body 30, and the switching apparatus 40.

The reduction apparatus rotary shaft 15 is disposed such that the rotary axis X3 thereof is substantially parallel to the rotary axis X1 of the transmission input shaft 13. The reduction apparatus rotary shaft 15 is supported to be capable of rotating about the rotary axis X3 when power is transmitted thereto. The rotary body 30 is joined to one end of the reduction apparatus rotary shaft 15 to be capable of rotating integrally therewith. The switching apparatus 40 is connected to the other end of the reduction apparatus rotary shaft 15.

The rotary body 30 is formed in a disc shape and, as described above, joined to the reduction apparatus rotary shaft 15 to be capable of rotating integrally therewith. The rotary body 30 is connected to the transmission input shaft 13 via the reduction apparatus rotary shaft 15, the switching apparatus 40, and so on to be capable of power transmission. The rotary body 30 acts as an inertial mass body, or in other words an inertial mass member that generates a moment of inertia.

The switching apparatus 40 switches the vibration reduction apparatus main body 20 between its function as a resonance point adjustment apparatus and its function as a dynamic damper by switching a connection condition between the transmission input shaft 13 and the rotary body 30. In other words, the switching apparatus 40 switches the spring 41 provided in the dynamic damper between an operative condition and an inoperative condition. As described above, the switching apparatus 40 is capable of switching between the first path 42 and the second path 43.

The first path 42 is a path on which the transmission input shaft 13 and the rotary body 30 are connected to be capable of transmitting power via the spring 41 serving as an elastic body. The second path 43 is a path on which the transmission input shaft 13 and the rotary body 30 are connected to be capable of transmitting power without passing through the spring 41. In other words, the second path 43 is a path on which the transmission input shaft 13 and the rotary body 30 are connected to be capable of transmitting power while bypassing the spring 41. When the first path 42 is selected, the spring 41 becomes operative such that the vibration reduction apparatus main body 20 functions as a dynamic damper. When the second path 43 is selected, on the other hand, the spring 41 becomes inoperative such that the vibration reduction apparatus main body 20 functions as a resonance point adjustment apparatus.

More specifically, the switching apparatus 40 is configured to include the spring 41, a first rotary member 44, a second rotary member 45, a drive gear 46, a driven gear 47, and a switch mechanism 48.

As will be described below, the spring 41 elastically supports the rotary body 30 on the transmission input shaft 13 when the first path 42 is selected.

The first rotary member 44 and the second rotary member 45 are annular plate-shaped members disposed coaxially with the rotary axis X1. The first rotary member 44 and the second rotary member 45 are disposed such that the transmission input shaft 13 is inserted into the radial direction inner side thereof. The first rotary member 44 and the second rotary member 45 are supported on the transmission input shaft 13 via a bush or the like to be capable of relative rotation about the rotary axis X1.

A first holding member 44a is joined to the first rotary member 44 to be capable of rotating integrally therewith. A second holding member 45a is joined to the second rotary member 45 to be capable of rotating integrally therewith. The first holding member 44a and the second holding member 45a are cylindrical members disposed coaxially with the rotary axis X1. Here, two first holding members 44a are provided. The first rotary member 44 and the second rotary member 45 are disposed in a positional relationship whereby the second holding member 45a is sandwiched between the two first holding members 44a relative to the radial direction.

The first holding members 44a and the second holding member 45a function as a spring holding mechanism for holding the spring 41. The first holding members 44a and the second holding member 45a cooperate to hold the spring 41 in a rotation direction. A plurality of springs 41 are held in the circumferential direction by the first holding members 44a and the second holding member 45a. The plurality of springs 41 are held so as to be interposed between the first holding members 44a and the second holding member 45a relative to the rotation direction (the circumferential direction).

The drive gear 46 is formed integrally with the second rotary member 45 on an outer peripheral surface of the second rotary member 45. The driven gear 47 is an annular plate-shaped member disposed coaxially with the rotary axis X3. The driven gear 47 is joined to the reduction apparatus rotary shaft 15 to be capable of rotating integrally therewith. The driven gear 47 is formed to have a smaller number of teeth than the drive gear 46. The reduction apparatus rotary shaft 15 and the rotary body 30 are disposed such that the driven gear 47 meshes with the drive gear 46. The drive gear 46 and the driven gear 47 function as a speed increasing gear that increases a speed of the rotary power transmitted to the rotary body 30 from the transmission input shaft 13.

The switch mechanism 48 is configured to include a synchromesh mechanism or the like that joins one of the first rotary member 44 and the second rotary member 45 selectively to the transmission input shaft 13. When an engagement member of the switch mechanism 48 moves to a first position (a spring engagement position), the first rotary member 44 is joined to the transmission input shaft 13 while a joint between the second rotary member 45 and the transmission input shaft 13 is released such that the second rotary member 45 enters an idling condition. When the engagement member of the switch mechanism 48 moves to a second position (a rigid engagement position), the second rotary member 45 is joined to the transmission input shaft 13 while a joint between the first rotary member 44 and the transmission input shaft 13 is released such that the first rotary member 44 enters an idling condition. The switch mechanism 48 is controlled by the ECU 11.

In the switching apparatus 40 configured as described above, when the switch mechanism 48 is controlled by the ECU 11 such that the engagement member moves to the first position (the spring engagement position), the first path 42 on which the transmission input shaft 13 and the rotary body 30 are connected via the spring 41 is selected. In other words, the rotary power transmitted to the transmission input shaft 13 from the engine 4 or the drive wheels 10 is input into (transmitted to) the reduction apparatus rotary shaft 15 via the first rotary member 44, the first holding members 44a, the spring 41, the second holding member 45a, the second rotary member 45, the drive gear 46, and the driven gear 47, in that order, and then transmitted to the rotary body 30. Meanwhile, the spring 41 deforms elastically in accordance with the magnitude of the power transmitted between the first holding members 44a and the second holding member 45a while being held by the first holding members 44a and the second holding member 45a. At this time, the power transmitted to the reduction apparatus rotary shaft 15 from the transmission input shaft 13 is increased in speed at a speed ratio (a gear ratio) between the drive gear 46 and the driven gear 47, and then transmitted to the rotary body 30 side. In other words, in this case, the first path 42 is constituted by the first rotary member 44, the first holding members 44a, the spring 41, the second holding member 45a, the second rotary member 45, the drive gear 46, and the driven gear 47.

When, on the other hand, the switch mechanism 48 of the switching apparatus 40 is controlled by the ECU 11 such that the engagement member moves to the second position (the rigid engagement position), the second path 43 on which the transmission input shaft 13 and the rotary body 30 are connected without passing through the spring 41, or in other words so as to bypass the spring 41, is selected. In other words, the rotary power transmitted to the transmission input shaft 13 from the engine 4 or the drive wheels 10 is input into (transmitted to) the reduction apparatus rotary shaft 15 via the second rotary member 45, the drive gear 46, and the driven gear 47, in that order, and then transmitted to the rotary body 30. Likewise at this time, the power transmitted to the reduction apparatus rotary shaft 15 from the transmission input shaft 13 is increased in speed at the speed ratio (the gear ratio) between the drive gear 46 and the driven gear 47, and then transmitted to the rotary body 30 side. In other words, in this case, the second path 43 is constituted by the second rotary member 45, the drive gear 46, and the driven gear 47.

Note that here, by controlling the switch mechanism 48 of the switching apparatus 40 using the ECU 11 such that the engagement member moves to a third position (a disengaged position) between the first position and the second position, the joints between the transmission input shaft 13 and both the first rotary member 44 and the second rotary member 45 can be released. In this case, both the first rotary member 44 and the second rotary member 45 of the switching apparatus 40 are set in the idling condition, and as a result, the connection between the transmission input shaft 13 and the rotary body 30 can be released such that power transmission between the transmission input shaft 13 and the rotary body 30 is blocked. In other words, the switch mechanism 48 also functions as a connection releasing mechanism capable of releasing the connection between the transmission input shaft 13 and the rotary body 30.

In the vehicle vibration reduction apparatus 1 configured as described above, when the first path 42 is selected by the switching apparatus 40, the rotary body 30 can be used as the dynamic damper inertial mass body. In other words, the vibration reduction apparatus main body 20 functions as a dynamic damper.

In this case, the spring 41 supports the rotary body 30 elastically on the transmission input shaft 13. More specifically, the spring 41 elastically supports the second holding member 45a, the second rotary member 45, the drive gear 46, the driven gear 47, the reduction apparatus rotary shaft 15, and the rotary body 30, which function as the inertial mass body of the dynamic damper in the vibration reduction apparatus main body 20, on the transmission input shaft 13. In other words, the spring 41 is interposed in the power transmission path between the transmission input shaft 13 and the rotary body 30 in order to connect the transmission input shaft 13 and the rotary body 30 to each other to be capable of relative rotation. To put it another way, in this case, the rotary body 30 is elastically supported on the transmission input shaft 13 by the spring 41 via the reduction apparatus rotary shaft 15, the driven gear 47, the drive gear 46, the second rotary member 45, the second holding member 45a, and so on.

As a result, when the first path 42 is selected by the switching apparatus 40, the vibration reduction apparatus main body 20 functions as a dynamic damper, the spring 41 acts as a member that adjusts a torsional rigidity of the dynamic damper, and the rotary body 30 and so on act as an inertial mass member for generating a moment of inertia in the dynamic damper. The vibration reduction apparatus main body 20 damps (absorbs) and thereby suppresses vibration of a specific frequency that acts on the second holding member 45a, second rotary member 45, drive gear 46, driven gear 47, reduction apparatus rotary shaft 15, and rotary body 30 serving as the inertial mass body of the vibration reduction apparatus main body 20 from the transmission input shaft 13 via the spring 41 by causing the rotary body 30 and so on to vibrate in an opposite phase to the vibration. In other words, the vehicle vibration reduction apparatus 1 exhibits a superior vibration damping effect (a dynamic damper effect) by causing the rotary body 30 and so on to vibrate in resonance with vibration of a specific frequency acting on the vibration reduction apparatus main body 20 in order to absorb resulting vibration energy as a substitute, with the result that the vibration is absorbed. To put it another way, the vehicle vibration reduction apparatus 1 damps and suppresses vibration of a specific frequency acting on the vibration reduction apparatus main body 20 by causing the rotary body 30 and so on to vibrate in an opposite phase so that the vibration is canceled out. Hence, with the vehicle vibration reduction apparatus 1, vibration such as primary vibration of an engine explosion occurring in the power train 3, for example, can be suppressed, enabling a reduction in vibration noise and an improvement in fuel efficiency. By applying vibration in an opposite phase to the vibration occurring in the drive system, the vehicle vibration reduction apparatus 1 can reduce the vibration of the power train 3, and as a result, NVH can be reduced to an allowable range.

When the second path 43 is selected by the switching apparatus 40, on the other hand, the rotary body 30 of the vehicle vibration reduction apparatus 1 can be used as the resonance point adjusting inertial mass body. In other words, the vibration reduction apparatus main body 20 functions as a resonance point adjustment apparatus.

In this case, the rotary body 30 is supported on the transmission input shaft 13 via the reduction apparatus rotary shaft 15, the driven gear 47, the drive gear 46, the second rotary member 45, and so on without passing through the spring 41.

As a result, when the second path 43 is selected by the switching apparatus 40, the vibration reduction apparatus main body 20 functions as a resonance point adjustment apparatus, and the rotary body 30 and so on act as an inertial mass member for generating a moment of inertia in the resonance point adjustment apparatus. Thus, the vibration reduction apparatus main body 20 can optimize a balance between an inertial mass on a driving side (a drive source side) upstream of a damper spring 7a of the damper 7 and an inertial mass on a driven side (the drive wheel side) downstream of the damper spring 7a such that a resonance frequency on the driven side can be reduced. Accordingly, the vehicle vibration reduction apparatus 1 can effectively suppress resonance by reducing a resonance point between the driving side and the driven side (a resonance point of the power train 3). Therefore, with the vehicle vibration reduction apparatus 1, vibration such as primary vibration of an engine explosion occurring in the power train 3, for example, can be suppressed, enabling a reduction in vibration noise and an improvement in fuel efficiency. Hence, the vehicle vibration reduction apparatus 1 can adjust the resonance point of the power train 3 by adjusting the inertial mass on the driven side using the rotary body 30 serving as an inertial mass body, and as a result, NVH can be reduced to the allowable range.

The ECU 11 performs control to switch the vibration reduction apparatus main body 20 between its function as a resonance point adjustment apparatus and its function as a dynamic damper in accordance with the condition of the vehicle 2 by controlling the switching apparatus 40 to switch between the first path 42 and the second path 43 in accordance with the operating condition.

Here, electric signals corresponding to detection results detected by various sensors, such as an accelerator depression amount sensor 70, a throttle opening sensor 71, a vehicle speed sensor 72, an engine rotation speed sensor 73, an input shaft rotation speed sensor 74, a rotary body rotation speed sensor 75, and a brake sensor 76, for example, are input into the ECU 11. The accelerator depression amount sensor 70 detects the accelerator depression amount, which is an amount (an accelerator operation amount) by which an accelerator pedal is operated by the driver. The throttle opening sensor 71 detects a throttle opening of the engine 4. The vehicle speed sensor 72 detects the vehicle speed, i.e. a travel speed of the vehicle 2. The engine rotation speed sensor 73 detects an engine rotation speed of the engine 4. The input shaft rotation speed sensor 74 detects an input shaft rotation speed of the transmission input shaft 13 of the main transmission 8. The rotary body rotation speed sensor 75 detects a rotation speed of the rotary body 30. The brake sensor 76 detects an amount (a brake operation amount) by which a brake pedal is operated by the driver, for example a master cylinder pressure or the like. The ECU 11 controls the switching apparatus 40 in accordance with the input detection results.

The ECU 11 according to this embodiment selects an optimum mode for current travel conditions of the vehicle 2 from among a dynamic damper mode, in which the engagement member of the switch mechanism 48 is positioned in the first position (the spring engagement position), and a resonance point adjustment mode, in which the engagement member is positioned in the second position (the rigid engagement position). Here, the ECU 11 is also capable of realizing a disconnection mode in which, for example, the engagement member of the switch mechanism 48 is moved to the third position (the disengaged position) such that the inertial mass body constituted by the rotary body 30 and so on is disconnected from the drive system. Here, the ECU 11 controls the switching apparatus 40 to select the optimum mode for the current travel conditions of the vehicle 2 from among a total of three vibration reduction modes, namely the dynamic damper mode, the resonance point adjustment mode, and the disconnection mode.

FIG. 2 shows an example of an operation of the vehicle vibration reduction apparatus 1. In FIG. 2, the abscissa shows the engine rotation speed, and the ordinate shows a vibration (NVH) level of the power train 3. Further, in FIG. 2, a solid line L1 shows the vibration level in the dynamic damper mode, a solid line L2 shows the vibration level in the resonance point adjustment mode, a solid line L3 shows the vibration level in the disconnection mode, and a dot-dash line L4 shows an allowable vibration level.

As regards the vibration level of the power train 3, in the example shown in FIG. 2, the vibration level in the dynamic damper mode (solid line L1) exhibits a relatively decreasing tendency immediately after the engine rotation speed reaches or exceeds a T/C lockup clutch ON rotation speed N1 such that a lockup clutch mechanism of the torque converter switches ON. Thereafter, with respect to the vibration level of the power train 3, when the engine rotation speed increases to a predetermined rotation speed N2, the vibration level in the dynamic damper mode and the vibration level in the resonance point adjustment mode (solid line L2) invert such that the vibration level in the resonance point adjustment mode exhibits a relatively decreasing tendency. The vibration level of the power train 3 typically tends to vary in this manner in accordance with the engine rotation speed.

Here, therefore, the ECU 11 performs control to switch between the first path 42 and the second path 43 by controlling the switching apparatus 40 on the basis of the engine rotation speed, i.e. an output rotation speed of the engine 4. As shown by a solid line L5 in the example of FIG. 2, when the engine rotation speed is in an operating region extending from the T/C lockup clutch ON rotation speed N1 to the predetermined rotation speed N2, the ECU 11 controls the switching apparatus 40 to select the first path 42. In so doing, the ECU 11 causes the vibration reduction apparatus main body 20 to function as a dynamic damper. When the engine rotation speed increases beyond the predetermined rotation speed N2, the ECU 11 controls the switching apparatus 40 to switch from the first path 42 to the second path 43. In so doing, the ECU 11 causes the vibration reduction apparatus main body 20 to function as a resonance point adjustment apparatus. Note that the predetermined rotation sped N2 can be set in advance in accordance with an actual vehicle evaluation or the like.

Hence, with the vehicle vibration reduction apparatus 1, vibration can be reduced in a low rotation region of the engine rotation speed using a dynamic damper effect, and vibration can be reduced in a high rotation region using a resonance point adjustment effect. Therefore, vibration can be reduced appropriately over a wide operating region. As a result, a vibration reduction performance of the vehicle vibration reduction apparatus 1 can be improved, and therefore, for example, comfortable travel can be realized in the vehicle 2. Moreover, it is possible to enlarge a rotation speed region in which the lockup clutch mechanism of the torque converter can be switched ON, for example, and therefore the lockup clutch mechanism can be switched ON in a comparatively low rotation speed region, enabling an improvement in fuel efficiency.

Further, in the vehicle vibration reduction apparatus 1, the vibration reduction apparatus main body 20 including the rotary body 30 is provided parallel to the power transmission path extending from the engine 4 to the drive wheels 10, and therefore the vehicle vibration reduction apparatus 1 only requires sufficient strength for the vibration reduction apparatus main body 20 to be able to respond to a power variation. Hence, in comparison with a case where the vibration reduction apparatus main body 20 is provided in series with the power transmission path extending from the engine 4 to the drive wheels 10, for example, strengths of the respective members can be relatively reduced. As a result, increases in the size and weight of the vibration reduction apparatus main body 20 of the vehicle vibration reduction apparatus 1 can be suppressed.

Furthermore, in the vehicle vibration reduction apparatus 1, the rotary power from the transmission input shaft 13 is increased in speed by the drive gear 46 and the driven gear 47 and then transmitted to the rotary body 30 side regardless of whether the vibration reduction apparatus main body 20 functions as a dynamic damper or as a resonance point adjustment apparatus. Accordingly, in the vehicle vibration reduction apparatus 1, an apparent inertial mass of the vibration reduction apparatus main body 20 including the rotary body 30 can be increased in proportion to a square of the speed ratio (=output rotation speed/input rotation speed) between the drive gear 46 and the driven gear 47 (i.e. a square of an inverse of the gear ratio). In the vehicle vibration reduction apparatus 1, assuming that the speed ratio between the drive gear 46 and the driven gear 47 is "4", for example, even when an actual inertial mass of the vibration reduction apparatus main body 20 is $\frac{1}{16}$ of a case in which the speed ratio is "1", a substantially equal vibration reduction effect can be obtained. In other words, in the vehicle vibration reduction apparatus 1, the actual inertial mass of the vibration reduction apparatus main body 20 required to obtain a predetermined vibration reduction characteristic can be relatively reduced. Likewise from this viewpoint, increases in the size and weight of the vibration reduction apparatus main body 20 of the vehicle vibration reduction apparatus 1 can be suppressed.

Note that in the vehicle vibration reduction apparatus 1, by having the ECU 11 control the switch mechanism 48 in accordance with the condition of the vehicle 2 to move the engagement member to the third position (the disengaged position), the inertial mass body including the first rotary member 44, the second rotary member 45, the drive gear 46, the driven gear 47, the reduction apparatus rotary shaft 15, the rotary body 30, and so on can be disconnected from the drive system. In the vehicle vibration reduction apparatus 1, therefore, the inertial mass of the drive system can be reduced if necessary, for example in an operating condition where vibration reduction by the vibration reduction apparatus main body 20 is not required, and as a result, an acceleration ability of the vehicle 2, for example, can be improved.

In the vehicle vibration reduction apparatus 1 according to the embodiment described above, a connection path (the power transmission path) between the transmission input shaft 13 and the rotary body 30 can be switched between the first path 42 and the second path 43 by the switching apparatus 40 in accordance with the condition of the vehicle 2. Hence, the vehicle vibration reduction apparatus 1 can use the single rotary body 30 separately as a resonance point adjustment apparatus and a dynamic damper, and therefore the vibration reduction performance of the apparatus can be improved while suppressing increases in the size and weight thereof. As a result, improvements in the ease with which the vehicle vibration reduction apparatus 1 is installed in the vehicle 2 as well as the fuel efficiency and the operating performance of the vehicle 2 can be achieved while reducing vibration appropriately so that comfortable travel can be realized in the vehicle 2.

Note that in the above description, the ECU 11 performs the control to switch between the first path 42 and the second path 43 by controlling the switching apparatus 40 on the basis of the engine rotation speed. The invention is not limited thereto, however, and the switch may be performed in accordance with various other conditions. For example, the vibration level of the power train 3 tends to vary likewise in accordance with the engine torque, and therefore the ECU 11 may perform the control to switch between the first path 42 and the second path 43 by controlling the switching apparatus 40 on the basis of the engine torque.

Further, in the above description, the ECU 11 controls the switching apparatus 40 to select the optimum mode for the current travel conditions of the vehicle 2 from among the total of three vibration reduction modes, namely the resonance point adjustment mode, the dynamic damper mode, and the disconnection mode. However, the disconnection mode need not be included, and the ECU 11 may control the switching apparatus 40 to select the optimum mode for the current travel conditions of the vehicle 2 from among a total of two vibration reduction modes including at least the resonance point adjustment mode and the dynamic damper mode.

Second Embodiment

Figure 3:
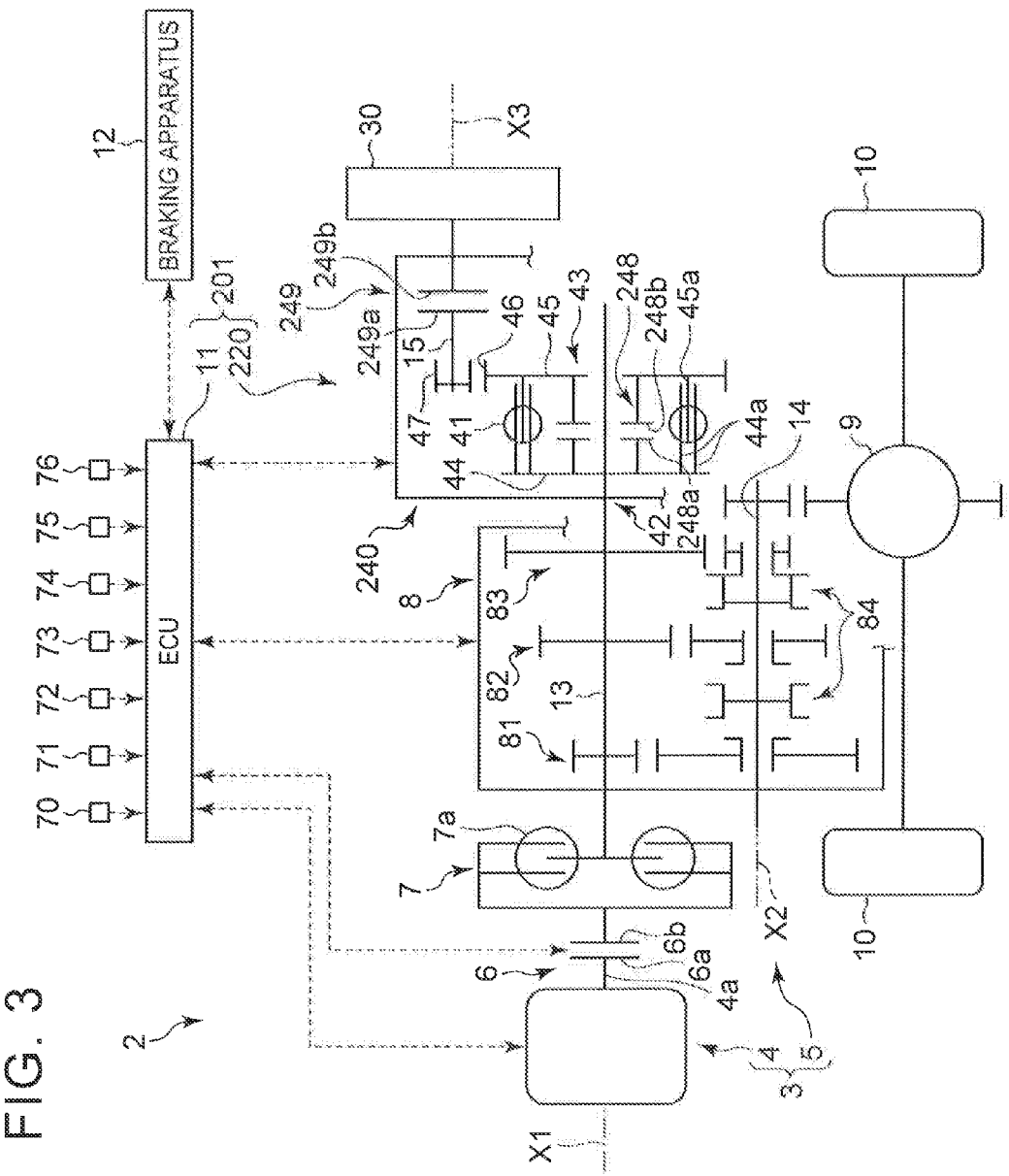
FIG. 3 is a schematic view showing a configuration of a vehicle vibration reduction apparatus according to a second embodiment.

FIG. 3 is a schematic view showing a configuration of a vehicle vibration reduction apparatus according to a second embodiment. The vehicle vibration reduction apparatus according to the second embodiment differs from that of the first embodiment in the configuration of the switching apparatus. Duplicate description of configurations, actions, and effects that are shared with the embodiment described above has, wherever possible, been omitted (this applies likewise to all embodiments described below).

A vehicle vibration reduction apparatus 201 according to this embodiment, shown in FIG. 3, includes a vibration reduction apparatus main body 220, and the ECU 11 serving as a control apparatus that controls the vibration reduction apparatus main body 220. The vibration reduction apparatus main body 220 includes the reduction apparatus rotary shaft 15, the rotary body 30, and a switching apparatus 240. The switching apparatus 240 is capable of switching between the first path 42 and the second path 43.

The switching apparatus 240 according to this embodiment is configured to include the spring 41, the first rotary member 44, the second rotary member 45, the drive gear 46, the driven gear 47, a damper lock clutch 248, and a reduction apparatus clutch 249 serving as a connection releasing mechanism. The spring 41, the first rotary member 44, the second rotary member 45, the drive gear 46, and the driven gear 47 are configured substantially identically to those of the switching apparatus 40 (see FIG. 1) described above. Note that here, however, the second rotary member 45 is supported on the transmission input shaft 13 to be capable of rotating relative thereto about the rotary axis X1, while the first rotary member 44 is joined to the transmission input shaft 13 to be capable of rotating integrally therewith.

The damper lock clutch 248 is provided parallel to the spring 41 in relation to the power transmission path in order to switch the spring 41 between the operative condition and the inoperative condition. The damper lock clutch 248 is provided between the first rotary member 44 and the second rotary member 45, and is capable of switching the first rotary member 44 and the second rotary member 45 between an engaged condition in which power can be transmitted between the first rotary member 44 and the second rotary member 45, and a disengaged condition in which the engagement between the first rotary member 44 and the second rotary member 45 is released. Various clutches, for example a friction disc clutch apparatus such as a multiplate wet clutch or a single plate dry clutch, may be used as the damper lock clutch 248. Here, the damper lock clutch 248 is a hydraulic apparatus that is operated by a clutch oil pressure, i.e. an oil pressure of working oil, for example. The damper lock clutch 248 can be switched between an engaged condition in which the first rotary member 44 and the second rotary member 45 are engaged to be capable of transmitting power by engaging a rotary member 248a on the first rotary member 44 side and a rotary member 248b on the second rotary member 45 side to be capable of power transmission, and a disengaged condition in which the engagement is released. When the damper lock clutch 248 is in the engaged condition, the first rotary member 44 and the second rotary member 45 are connected to be capable of rotating integrally such that power can be transmitted between the first rotary member 44 and the second rotary member 45 without passing through the spring 41. When the damper lock clutch 248 is in the disengaged condition, on the other hand, the rotary member 248a and the rotary member 248b are disconnected such that power transmission between the first rotary member 44 and the second rotary member 45 via the damper lock clutch 248 is blocked. When an engagement force by which the rotary member 248a and the rotary member 248b are engaged to each other is at zero, the engagement is released such that the damper lock clutch 248 enters the disengaged condition, and as the engagement force increases, the damper lock clutch 248 passes through a half engaged condition (a slip condition) and eventually reaches a fully engaged condition. Here, the rotary member 248a is a member that rotates integrally with the first rotary member 44. The rotary member 248b, meanwhile, is a member that rotates integrally with the second rotary member 45. The damper lock clutch 248 is controlled by the ECU 11.

The reduction apparatus clutch 249 is capable of switching the transmission input shaft 13 and the rotary body 30 between an engaged condition in which power can be transmitted between the transmission input shaft 13 and the rotary body 30, and a disengaged condition in which the engagement between the transmission input shaft 13 and the rotary body 30 is released. In other words, the reduction apparatus clutch 249 is capable of releasing the connection between the transmission input shaft 13 and the rotary body 30. The reduction apparatus clutch 249 according to this embodiment is provided on the reduction apparatus rotary shaft 15 on a power transmission path between the driven gear 47 and the rotary body 30. Various clutches, for example a friction disc clutch apparatus such as a multiplate wet clutch or a single plate dry clutch, may be used as the reduction apparatus clutch 249. Here, the reduction apparatus clutch 249 is a hydraulic apparatus that is operated by a clutch oil pressure, i.e. an oil pressure of working oil, for example. The reduction apparatus clutch 249 can be switched between an engaged condition in which the driven gear 47 and the rotary body 30 are engaged to be capable of transmitting power by engaging a rotary member 249a on the driven gear 47 side and a rotary member 249b on the rotary body 30 side to be capable of power transmission, and a disengaged condition in which the engagement is released. When the reduction apparatus clutch 249 is in the engaged condition, the rotary member 249a and the rotary member 249b are connected such that power can be transmitted between the transmission input shaft 13 and the rotary body 30. When the reduction apparatus clutch 249 is in the disengaged condition, on the other hand, the rotary member 249a and the rotary member 249b are disconnected such that power transmission between the transmission input shaft 13 and the rotary body 30 is blocked. When an engagement force by which the rotary member 249a and the rotary member 249b are engaged to each other is at zero, the engagement is released such that the reduction apparatus clutch 249 enters the disengaged condition, and as the engagement force increases, the reduction apparatus clutch 249 passes through a half engaged condition (a slip condition) and eventually reaches a fully engaged condition. Here, the transmission input shaft 13 is divided into the driven gear 47 side and the rotary body 30 side. The rotary member 249a is a member that rotates integrally with the part of the divided reduction apparatus rotary shaft 15 on the driven gear 47 side. The rotary member 249b, meanwhile, is a member that rotates integrally with the part of the divided reduction apparatus rotary shaft 15 on the rotary body 30 side. The reduction apparatus clutch 249 is controlled by the ECU 11.

In the switching apparatus 240 configured as described above, the first path 42 on which the transmission input shaft 13 and the rotary body 30 are connected via the spring 41 is selected by controlling the damper lock clutch 248 and the reduction apparatus clutch 249 using the ECU 11 such that the damper lock clutch 248 is set in the disengaged condition and the reduction apparatus clutch 249 is set in the engaged condition. In other words, the rotary force transmitted to the transmission input shaft 13 from the engine 4 or the drive wheels 10 is input into (transmitted to) the reduction apparatus rotary shaft 15 via the first rotary member 44, the first holding members 44a, the spring 41, the second holding member 45a, the second rotary member 45, the drive gear 46, and the driven gear 47, in that order, and then transmitted to the rotary body 30. In other words, in this case, the first path 42 is constituted by the first rotary member 44, the first holding members 44a, the spring 41, the second holding member 45a, the second rotary member 45, the drive gear 46, and the driven gear 47.

Meanwhile, in the switching apparatus 240, the second path 43 on which the transmission input shaft 13 and the rotary body 30 are connected without passing through the spring 41, or in other words so as to bypass the spring 41, is selected by controlling the damper lock clutch 248 and the reduction apparatus clutch 249 using the ECU 11 such that the damper lock clutch 248 is set in the engaged condition and the reduction apparatus clutch 249 is set in the engaged condition. In other words, the rotary power transmitted to the transmission input shaft 13 from the engine 4 or the drive wheels 10 is input into (transmitted to) the reduction apparatus rotary shaft 15 via the first rotary member 44, the damper lock clutch 248, the second rotary member 45, the drive gear 46, and the driven gear 47, in that order, and then transmitted to the rotary body 30. In other words, in this case, the second path 43 is constituted by the first rotary member 44, the damper lock clutch 248, the second rotary member 45, the drive gear 46, and the driven gear 47.

Furthermore, by controlling the reduction apparatus clutch 249 using the ECU 11 such that the reduction apparatus clutch 249 is set in the disengaged condition, the switching apparatus 240 can release the connection between the transmission input shaft 13 and the rotary body 30. In this case, the switching apparatus 240 can block power transmission between the transmission input shaft 13 and the rotary body 30.

In the vehicle vibration reduction apparatus 201 configured as described above, when the first path 42 is selected by the switching apparatus 240, the rotary body 30 can be used as the dynamic damper inertial mass body, or in other words, the vibration reduction apparatus main body 220 functions as a dynamic damper. When the second path 43 is selected by the switching apparatus 240, on the other hand, the rotary body 30 of the vehicle vibration reduction apparatus 201 can be used as the resonance point adjusting inertial mass body. In other words, the vibration reduction apparatus main body 220 functions as a resonance point adjustment apparatus.

The ECU 11 performs control to switch the vibration reduction apparatus main body 220 between its function as a resonance point adjustment apparatus and its function as a dynamic damper in accordance with the condition of the vehicle 2 by controlling the switching apparatus 240 to switch between the first path 42 and the second path 43 in accordance with the operating condition. Here, the ECU 11 is capable of realizing a dynamic damper mode in which the damper lock clutch 248 is in the disengaged condition and the reduction apparatus clutch 249 is in the engaged condition, a resonance point adjustment mode in which the damper lock clutch 248 is in the engaged condition and the reduction apparatus clutch 249 is in the engaged condition, and a disconnection mode in which the reduction apparatus clutch 249 is in the disengaged condition. The ECU 11 controls the switching apparatus 240 to select the optimum mode for the current travel conditions of the vehicle 2 from among a total of three vibration reduction modes, namely the dynamic damper mode, the resonance point adjustment mode, and the disconnection mode. As a result, the vibration reduction performance of the vehicle vibration reduction apparatus 201 can be improved.

In the vehicle vibration reduction apparatus 201 according to the embodiment described above, the connection path (the power transmission path) between the transmission input shaft 13 and the rotary body 30 can be switched between the first path 42 and the second path 43 by the switching apparatus 240 in accordance with the condition of the vehicle 2. Hence, the vehicle vibration reduction apparatus 201 can use the single rotary body 30 separately as a resonance point adjustment apparatus and a dynamic damper, and therefore the vibration reduction performance of the apparatus can be improved while suppressing increases in the size and weight thereof. As a result, improvements in the ease with which the vehicle vibration reduction apparatus 201 is installed in the vehicle 2 as well as the fuel efficiency and the operating performance of the vehicle 2 can be achieved while reducing vibration appropriately so that comfortable travel can be realized in the vehicle 2.

Third Embodiment

Figure 4:
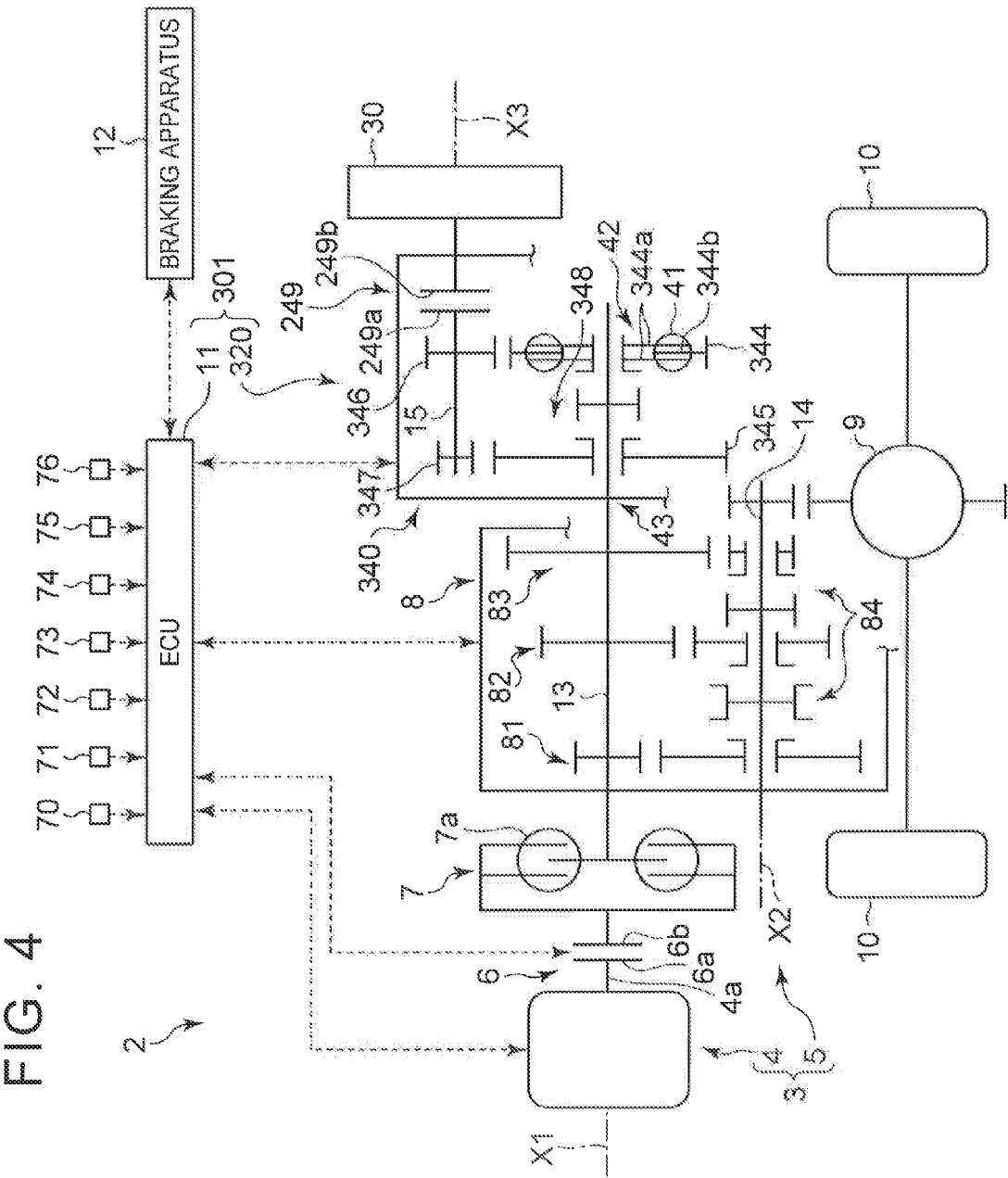
FIG. 4 is a schematic view showing a configuration of a vehicle vibration reduction apparatus according to a third embodiment.
Figure 5:
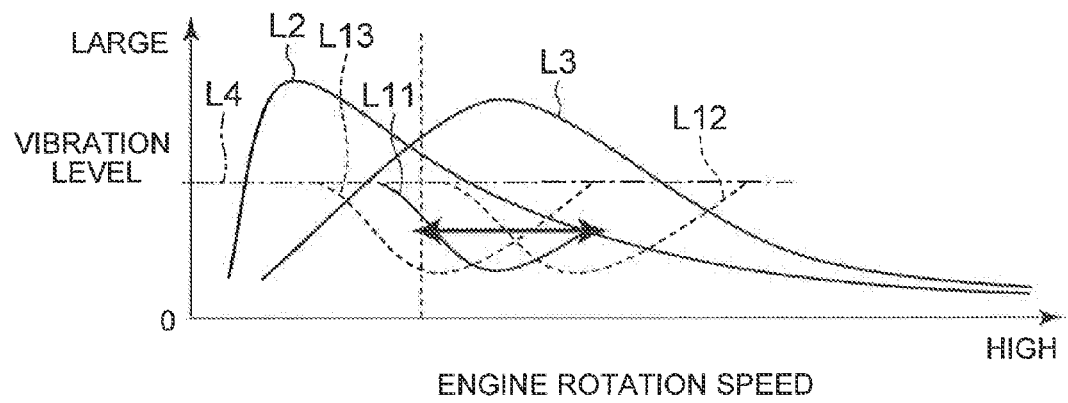
FIG. 5 is a diagram illustrating an example of an operation of the vehicle vibration reduction apparatus according to the third embodiment.

FIG. 4 is a schematic view showing a configuration of a vehicle vibration reduction apparatus according to a third embodiment, and FIG. 5 is a diagram illustrating an example of an operation of the vehicle vibration reduction apparatus according to the third embodiment. The vehicle vibration reduction apparatus according to the third embodiment differs from those of the first and second embodiments in the configuration of the switching apparatus.

A vehicle vibration reduction apparatus 301 according to this embodiment, shown in FIG. 4, includes a vibration reduction apparatus main body 320, and the ECU 11 serving as a control apparatus that controls the vibration reduction apparatus main body 320. The vibration reduction apparatus main body 320 includes the reduction apparatus rotary shaft 15, the rotary body 30, and a switching apparatus 340. The switching apparatus 340 is capable of switching between the first path 42 and the second path 43.

The switching apparatus 340 according to this embodiment includes the spring 41, a first drive gear 344, a second drive gear 345, a first driven gear 346, a second driven gear 347, a switch mechanism 348, and the reduction apparatus clutch 249 serving as a connection releasing mechanism.

The first drive gear 344 and the second drive gear 345 are annular plate-shaped members disposed coaxially with the rotary axis X1. The first drive gear 344 and the second drive gear 345 are disposed such that the transmission input shaft 13 is inserted into the radial direction inner side thereof. The first drive gear 344 and the second drive gear 345 are supported on the transmission input shaft 13 via a bush or the like to be capable of relative rotation about the rotary axis X1. The first drive gear 344 and the second drive gear 345 are formed to have different numbers of teeth, and here, the number of teeth of the first drive gear 344 is relatively small, while the number of teeth of the second drive gear 345 is relatively large.

The first drive gear 344 holds the spring 41 in the rotation direction. A plurality of springs 41 are held in the circumferential direction by the first drive gear 344. The first drive gear 344 is divided into an inner diameter portion 344a positioned on the radial direction inner side and an outer diameter portion 344b positioned on a radial direction outer side, and the spring 41 is held between the inner diameter portion 344a and the outer diameter portion 344b relative to the circumferential direction. Gear teeth are formed on the outer diameter portion 344b of the first drive gear 344. The plurality of springs 41 are held so as to be interposed between the inner diameter portion 344a and the outer diameter portion 344b relative to the rotation direction (the circumferential direction), and when power is transmitted thereto, the plurality of springs 41 elastically deform in accordance with the magnitude of the transmitted power.

The first driven gear 346 and the second driven gear 347 are annular plate-shaped members disposed coaxially with the rotary axis X3. The first driven gear 346 and the second driven gear 347 are joined to the reduction apparatus rotary shaft 15 to be capable of rotating integrally therewith. The first driven gear 346 and the second driven gear 347 are formed to have different numbers of teeth, and here, the number of teeth of the first driven gear 346 is relatively large, while the number of teeth of the second driven gear 347 is relatively small. Here, the first driven gear 346 is formed with a smaller number of teeth than the first drive gear 344, and the second driven gear 347 is formed with a smaller number of teeth than the second drive gear 345. The reduction apparatus rotary shaft 15, the reduction apparatus clutch 249, and the rotary body 30 are disposed such that the first driven gear 346 meshes with the first drive gear 344 and the second driven gear 347 meshes with the second drive gear 345. The first drive gear 344 and first driven gear 346 and the second drive gear 345 and second driven gear 347 respectively function as speed increasing gears that increase the speed of the rotary power transmitted to the rotary body 30 from the transmission input shaft 13.

The switch mechanism 348 is configured to include a synchromesh mechanism or the like that joins one of the first drive gear 344 and the second drive gear 345 selectively to the transmission input shaft 13. When an engagement member of the switch mechanism 348 moves to the first position (the spring engagement position), the first drive gear 344 is joined to the transmission input shaft 13 while a joint between the second drive gear 345 and the transmission input shaft 13 is released such that the second drive gear 345 enters an idling condition. When the engagement member of the switch mechanism 348 moves to the second position (the rigid engagement position), the second drive gear 345 is joined to the transmission input shaft 13 while a joint between the first drive gear 344 and the transmission input shaft 13 is released such that the first drive gear 344 enters an idling condition. When the engagement member of the switch mechanism 348 moves to the third position (the disengaged position), the joints between the transmission input shaft 13 and both the first drive gear 344 and the second drive gear 345 are released such that both the first drive gear 344 and the second drive gear 345 enter the idling condition. The switch mechanism 348 is controlled by the ECU 11.

Note that here, the vehicle vibration reduction apparatus 301 is configured such that both the switch mechanism 348 and the reduction apparatus clutch 249 are capable of functioning as a connection releasing mechanism, but only one thereof need function as a connection releasing mechanism. When the engagement member of the switch mechanism 348 is configured to be capable of moving to the third position, as described above, the vehicle vibration reduction apparatus 301 may be configured not to include the reduction apparatus clutch 249. Further, when the vehicle vibration reduction apparatus 301 includes the reduction apparatus clutch 249, as described above, the engagement member of the switch mechanism 348 may be configured to be unable to move to the third position.

In the switching apparatus 340 configured as described above, when the switch mechanism 348 is controlled by the ECU 11 such that the engagement member moves to the first position (the spring engagement position), the first path 42 on which the transmission input shaft 13 and the rotary body 30 are connected via the spring 41 is selected. In other words, the rotary power transmitted to the transmission input shaft 13 from the engine 4 or the drive wheels 10 is input into (transmitted to) the reduction apparatus rotary shaft 15 via the inner diameter portion 344a of the first drive gear 344, the spring 41, the outer diameter portion 344b of the first drive gear 344, and the first driven gear 346, in that order, and then transmitted to the rotary body 30. In other words, in this case, the first path 42 is constituted by the inner diameter portion 344a of the first drive gear 344, the spring 41, the outer diameter portion 344b of the first drive gear 344, and the first driven gear 346.

When, on the other hand, the switch mechanism 348 of the switching apparatus 340 is controlled by the ECU 11 such that the engagement member moves to the second position (the rigid engagement position), the second path 43 on which the transmission input shaft 13 and the rotary body 30 are connected without passing through the spring 41, or in other words so as to bypass the spring 41, is selected. In other words, the rotary power transmitted to the transmission input shaft 13 from the engine 4 or the drive wheels 10 is input into (transmitted to) the reduction apparatus rotary shaft 15 via the second drive gear 345 and the second driven gear 347, in that order, and then transmitted to the rotary body 30. In other words, in this case, the second path 43 is constituted by the second drive gear 345 and the second driven gear 347.

Furthermore, by having the ECU 11 control the switch mechanism 348 of the switching apparatus 340 such that the engagement member moves to the third position (the disengaged position), the connection between the transmission input shaft 13 and the rotary body 30 can be released. In this case, the switching apparatus 340 can establish a condition in which power transmission between the transmission input shaft 13 and the rotary body 30 is blocked.

In the vehicle vibration reduction apparatus 301 configured as described above, when the first path 42 is selected by the switching apparatus 340, the rotary body 30 can be used as the dynamic damper inertial mass body, or in other words, the vibration reduction apparatus main body 320 functions as a dynamic damper. When the second path 43 is selected by the switching apparatus 340, on the other hand, the rotary body 30 of the vehicle vibration reduction apparatus 301 can be used as the resonance point adjusting inertial mass body. In other words, the vibration reduction apparatus main body 320 functions as a resonance point adjustment apparatus.

The ECU 11 performs control to switch the vibration reduction apparatus main body 320 between its function as a resonance point adjustment apparatus and its function as a dynamic damper in accordance with the condition of the vehicle 2 by controlling the switching apparatus 340 to switch between the first path 42 and the second path 43 in accordance with the operating condition. Here, the ECU 11 is capable of realizing a dynamic damper mode in which the engagement member of the switch mechanism 348 is in the first position (the spring engagement position), a resonance point adjustment mode in which the engagement member of the switch mechanism 348 is in the second position (the rigid engagement position), and a disconnection mode in which the engagement member of the switch mechanism 348 is in the third position (the disengaged position). The ECU 11 controls the switching apparatus 340 to select the optimum mode for the current travel conditions of the vehicle 2 from among the total of three vibration reduction modes, namely the dynamic damper mode, the resonance point adjustment mode, and the disconnection mode. As a result, the vibration reduction performance of the vehicle vibration reduction apparatus 301 can be improved.

Further, in this case, by appropriately adjusting a speed ratio (a gear ratio) between the first drive gear 344 and the first driven gear 346 and a speed ratio (a gear ratio) between the second drive gear 345 and the second driven gear 347 during design and manufacture of the vehicle vibration reduction apparatus 301, the vibration reduction characteristic of the vibration reduction apparatus main body 320 can easily be set to a desired characteristic. For example, by appropriately adjusting the speed ratio between the first drive gear 344 and the first driven gear 346, a natural frequency of the vibration reduction apparatus main body 320 of the vehicle vibration reduction apparatus 301 can be adjusted as shown by a solid line L11 and dotted lines L12, L13 in FIG. 5, and thus a damper characteristic of the dynamic damper can easily be set to a desired characteristic. As a result, the vehicle vibration reduction apparatus 301 can be provided with superior compatibility, and the vibration reduction performance can be optimized.

In the vehicle vibration reduction apparatus 301 according to the embodiment described above, the connection path (the power transmission path) between the transmission input shaft 13 and the rotary body 30 can be switched between the first path 42 and the second path 43 by the switching apparatus 340 in accordance with the condition of the vehicle 2. Hence, the vehicle vibration reduction apparatus 301 can use the single rotary body 30 separately as a resonance point adjustment apparatus and a dynamic damper, and therefore the vibration reduction performance of the apparatus can be improved while suppressing increases in the size and weight thereof. As a result, improvements in the ease with which the vehicle vibration reduction apparatus 301 is installed in the vehicle 2 as well as the fuel efficiency and the operating performance of the vehicle 2 can be achieved while reducing vibration appropriately so that comfortable travel can be realized in the vehicle 2.

Fourth Embodiment

Figure 6:
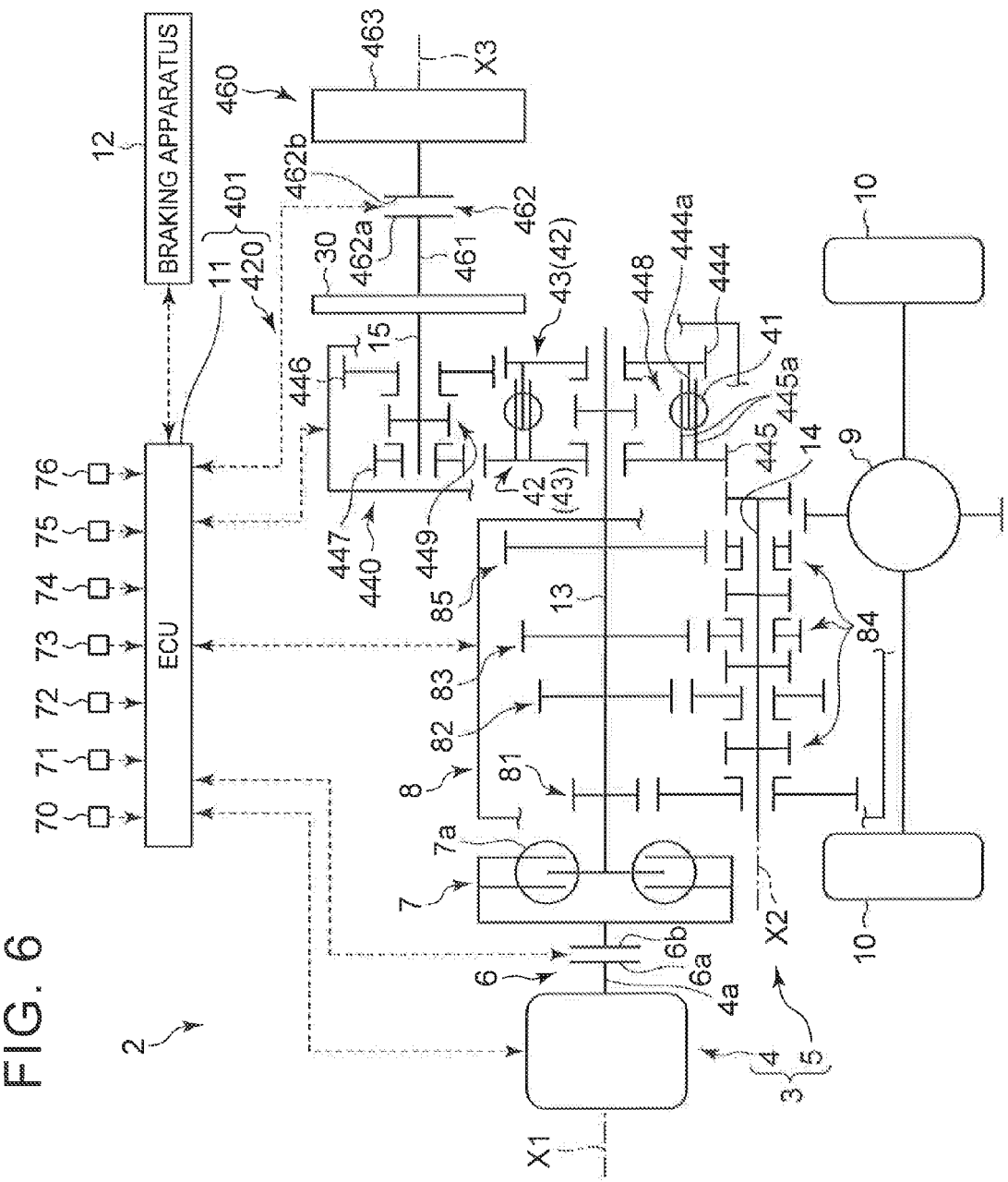
FIG. 6 is a schematic view showing a configuration of a vehicle vibration reduction apparatus according to a fourth embodiment.

FIG. 6 is a schematic view showing a configuration of a vehicle vibration reduction apparatus according to a fourth embodiment. The vehicle vibration reduction apparatus according to the fourth embodiment differs from those of the first, second, and third embodiments in the configuration of the switching apparatus and in that the vehicle vibration reduction apparatus according to the fourth embodiment includes a variable inertial mass apparatus.

A vehicle vibration reduction apparatus 401 according to this embodiment, shown in FIG. 6, includes a vibration reduction apparatus main body 420, and the ECU 11 serving as a control apparatus that controls the vibration reduction apparatus main body 420. The vibration reduction apparatus main body 420 includes the reduction apparatus rotary shaft 15, the rotary body 30, and a switching apparatus 440. The switching apparatus 440 is capable of switching between the first path 42 and the second path 43. Note that here, the main transmission 8 is configured to include a gear position 85 in addition to the gear positions 81, 82, 83.

The switching apparatus 440 according to this embodiment is capable of speed-shifting the rotary power transmitted to the rotary body 30 on the first path 42 or the second path 43 at a plurality of speed ratios. Here, the switching apparatus 440 includes switch mechanisms 448, 449 provided respectively on the transmission input shaft 13 and the reduction apparatus rotary shaft 15.

The vibration reduction apparatus main body 420 according to this embodiment further includes a variable inertial mass apparatus 460 that variably controls the inertial mass of the rotary body 30.

More specifically, the switching apparatus 440 is configured to include the spring 41, a first drive gear 444, a second drive gear 445, a first driven gear 446, a second driven gear 447, the switch mechanism 448, and the switch mechanism 449. Note that the switching apparatus 440 according to this embodiment does not include the reduction apparatus clutch 249 (see FIG. 3).

The first drive gear 444 and the second drive gear 445 are annular plate-shaped members disposed coaxially with the rotary axis X1. The first drive gear 444 and the second drive gear 445 are disposed such that the transmission input shaft 13 is inserted into the radial direction inner side thereof. The first drive gear 444 and the second drive gear 445 are supported on the transmission input shaft 13 via a bush or the like to be capable of relative rotation about the rotary axis X1. The first drive gear 444 and the second drive gear 445 are formed to have different numbers of teeth, and here, the number of teeth of the first drive gear 444 is relatively small, while the number of teeth of the second drive gear 445 is relatively large.

A first holding member 444a is joined to the first drive gear 444 to be capable of rotating integrally therewith. A second holding member 445a is joined to the second drive gear 445 to be capable of rotating integrally therewith. The first holding member 444a and the second holding member 445a are cylindrical members disposed coaxially with the rotary axis X1. Here, two second holding members 445a are provided. The first drive gear 444 and the second drive gear 445 are disposed in a positional relationship whereby the first holding member 444a is sandwiched between the two second holding members 445a relative to the radial direction.

The first holding member 444a and the second holding members 445a function as a spring holding mechanism for holding the spring 41. The first holding member 444a and the second holding members 445a cooperate to hold the spring 41 in the rotation direction. A plurality of springs 41 are held in the circumferential direction by the first holding member 444a and the second holding members 445a. The plurality of springs 41 are held so as to be interposed between the first holding member 444a and the second holding members 445a relative to the rotation direction (the circumferential direction), and when power is transmitted thereto, the plurality of springs 41 elastically deform in accordance with the magnitude of the transmitted power.

The first driven gear 446 and the second driven gear 447 are annular plate-shaped members disposed coaxially with the rotary axis X3. The first driven gear 446 and the second driven gear 447 are disposed such that the reduction apparatus rotary shaft 15 is inserted into the radial direction inner side thereof. The first driven gear 446 and the second driven gear 447 are supported on the reduction apparatus rotary shaft 15 via a bush or the like to be capable of relative rotation about the rotary axis X3. The first driven gear 446 and the second driven gear 447 are formed to have different numbers of teeth, and here, the number of teeth of the first driven gear 446 is relatively large, while the number of teeth of the second driven gear 447 is relatively small. Here, the first driven gear 446 is formed with a smaller number of teeth than the first drive gear 444, and the second driven gear 447 is formed with a smaller number of teeth than the second drive gear 445. The first driven gear 446 is disposed to mesh with the first drive gear 444, and the second driven gear 447 is disposed to mesh with the second drive gear 445. The first drive gear 444 and first driven gear 446 and the second drive gear 445 and second driven gear 447 respectively function as speed increasing gears that increase the speed of the rotary power transmitted to the rotary body 30 from the transmission input shaft 13.

The switch mechanism 448 is configured to include a synchromesh mechanism or the like that joins one of the first drive gear 444 and the second drive gear 445 selectively to the transmission input shaft 13. When an engagement member of the switch mechanism 448 moves to the first position, the first drive gear 444 is joined to the transmission input shaft 13 while a joint between the second drive gear 445 and the transmission input shaft 13 is released such that the second drive gear 445 enters an idling condition. When the engagement member of the switch mechanism 448 moves to the second position, the second drive gear 445 is joined to the transmission input shaft 13 while a joint between the first drive gear 444 and the transmission input shaft 13 is released such that the first drive gear 444 enters the idling condition. When the engagement member of the switch mechanism 448 moves to the third position (the disengaged position), the joints between the transmission input shaft 13 and both the first drive gear 444 and the second drive gear 445 are released such that both the first drive gear 444 and the second drive gear 445 enter the idling condition. The switch mechanism 448 is controlled by the ECU 11.

The switch mechanism 449 is configured to include a synchromesh mechanism or the like that joins one of the first driven gear 446 and the second driven gear 447 selectively to the reduction apparatus rotary shaft 15. When an engagement member of the switch mechanism 449 moves to the first position, the first driven gear 446 is joined to the reduction apparatus rotary shaft 15 while a joint between the second driven gear 447 and the reduction apparatus rotary shaft 15 is released such that the second driven gear 447 enters an idling condition. When the engagement member of the switch mechanism 449 moves to the second position, the second driven gear 447 is joined to the reduction apparatus rotary shaft 15 while a joint between the first driven gear 446 and the reduction apparatus rotary shaft 15 is released such that the first driven gear 446 enters the idling condition. When the engagement member of the switch mechanism 449 moves to the third position (the disengaged position), the joints between the reduction apparatus rotary shaft 15 and both the first driven gear 446 and the second driven gear 447 are released such that both the first driven gear 446 and the second driven gear 447 enter the idling condition. The switch mechanism 449 is controlled by the ECU 11.

The switching apparatus 440 configured as described above can switch between the first path 42 and the second path 43 by having the ECU 11 control the switch mechanism 448 and the switch mechanism 449 to control the positions of the respective engagement members thereof. Further, the rotary power transmitted to the rotary body 30 via the first path 42 or the second path 43 can be speed-shifted at a plurality of speed ratios.

In the switching apparatus 440 configured as described above, when the switch mechanism 448 and the switch mechanism 449 are controlled by the ECU 11 such that the engagement member of the switch mechanism 448 is in the first position and the engagement member of the switch mechanism 449 is in the second position, or the engagement member of the switch mechanism 448 is in the second position and the engagement member of the switch mechanism 449 is in the first position, the first path 42 is selected.

When the engagement member of the switch mechanism 448 is in the first position and the engagement member of the switch mechanism 449 is in the second position, the rotary power transmitted to the transmission input shaft 13 from the engine 4 or the drive wheels 10 is transmitted as follows. The rotary power transmitted to the transmission input shaft 13 is input into (transmitted to) the reduction apparatus rotary shaft 15 via the first drive gear 444, the first holding member 444a, the spring 41, the second holding members 445a, the second drive gear 445, and the second driven gear 447, in that order, and then transmitted to the rotary body 30. In other words, in this case, the first path 42 is constituted by the first drive gear 444, the first holding member 444a, the spring 41, the second holding members 445a, the second drive gear 445, and the second driven gear 447.

When the engagement member of the switch mechanism 448 is in the second position and the engagement member of the switch mechanism 449 is in the first position, the rotary power transmitted to the transmission input shaft 13 from the engine 4 or the drive wheels 10 is transmitted as follows. The rotary power transmitted to the transmission input shaft 13 is input into (transmitted to) the reduction apparatus rotary shaft 15 via the second drive gear 445, the second holding members 445a, the spring 41, the first holding member 444a, the first drive gear 444, and the first driven gear 446, in that order, and then transmitted to the rotary body 30. In other words, in this case, the first path 42 is constituted by the second drive gear 445, the second holding members 445a, the spring 41, the first holding member 444a, the first drive gear 444, and the first driven gear 446.

In the case of the two patterns described above, the switching apparatus 440 can vary the speed ratio of the rotary power transmitted to the rotary body 30 on the first path 42 in accordance with the speed ratio between the first drive gear 444 and the first driven gear 446 and the speed ratio between the second drive gear 445 and the second driven gear 447.

Meanwhile, when the switch mechanism 448 and the switch mechanism 449 of the switching apparatus 440 are controlled by the ECU 11 such that the engagement member of the switch mechanism 448 is in the first position and the engagement member of the switch mechanism 449 is in the first position, or the engagement member of the switch mechanism 448 is in the second position and the engagement member of the switch mechanism 449 is in the second position, the second path 43 is selected.

When the engagement member of the switch mechanism 448 is in the first position and the engagement member of the switch mechanism 449 is in the first position, the rotary power transmitted to the transmission input shaft 13 from the engine 4 or the drive wheels 10 is transmitted as follows. The rotary power transmitted to the transmission input shaft 13 is input into (transmitted to) the reduction apparatus rotary shaft 15 via the first drive gear 444 and the first driven gear 446, in that order, and then transmitted to the rotary body 30. In other words, in this case, the second path 43 is constituted by the first drive gear 444 and the first driven gear 446.

When the engagement member of the switch mechanism 448 is in the second position and the engagement member of the switch mechanism 449 is in the second position, the rotary power transmitted to the transmission input shaft 13 from the engine 4 or the drive wheels 10 is transmitted as follows. The rotary power transmitted to the transmission input shaft 13 is input into (transmitted to) the reduction apparatus rotary shaft 15 via the second drive gear 445 and the second driven gear 447, in that order, and then transmitted to the rotary body 30. In other words, in this case, the second path 43 is constituted by the second drive gear 445 and the second driven gear 447.

Likewise in the case of the two patterns described above, the switching apparatus 440 can vary the speed ratio of the rotary power transmitted to the rotary body 30 on the second path 43 in accordance with the speed ratio between the first drive gear 444 and the first driven gear 446 and the speed ratio between the second drive gear 445 and the second driven gear 447.

Further, when the switch mechanism 448 and the switch mechanism 449 of the switching apparatus 440 are controlled by the ECU 11 such that either the engagement member of the switch mechanism 448 or the engagement member of the switch mechanism 449 is in the third position (the disengaged position), the connection between the transmission input shaft 13 and the rotary body 30 can be released. In this case, the switching apparatus 440 can block power transmission between the transmission input shaft 13 and the rotary body 30.

Furthermore, as described above, the vibration reduction apparatus main body 420 according to this embodiment also includes the variable inertial mass apparatus 460 that variably controls the inertial mass of the rotary body 30. The variable inertial mass apparatus 460 includes an extension shaft 461, a variable inertia clutch 462, and a rotary body 463 serving as an additional inertial mass body.

The extension shaft 461 is joined to the rotary body 30 so as to rotate integrally therewith about the rotary axis X3. The rotary body 30 is joined to one end of the extension shaft 461, and the rotary body 463 is joined to the other end. The rotary body 463 is formed in a disc shape. The rotary body 463 acts as an inertial mass body, or in other words an inertial mass member that generates a moment of inertia.

The variable inertia clutch 462 is provided on the extension shaft 461, and is capable of switching the rotary body 30 and the rotary body 463 between an engaged condition in which power can be transmitted between the rotary body 30 and the rotary body 463, and a disengaged condition in which the engagement between the rotary body 30 and the rotary body 463 is released. In other words, the variable inertia clutch 462 is capable of releasing the connection between the rotary body 30 and the rotary body 463. Various clutches, for example a friction disc clutch apparatus such as a multiplate wet clutch or a single plate dry clutch, may be used as the variable inertia clutch 462. Here, the variable inertia clutch 462 is a hydraulic apparatus that is operated by a clutch oil pressure, i.e. an oil pressure of working oil, for example. The variable inertia clutch 462 can be switched between an engaged condition in which the rotary body 30 and the rotary body 463 are engaged to be capable of transmitting power by engaging a rotary member 462a on the rotary body 30 side and a rotary member 462b on the rotary body 463 side to be capable of power transmission, and a disengaged condition in which the engagement is released. When the variable inertia clutch 462 is in the engaged condition, the rotary member 462a and the rotary member 462b are connected such that the rotary body 30 and the rotary body 463 can rotate integrally. When the variable inertia clutch 462 is in the disengaged condition, on the other hand, the rotary member 462a and the rotary member 462b are disconnected such that the rotary body 463 is disconnected from the rotary body 30. When an engagement force by which the rotary member 462a and the rotary member 462b are engaged to each other is at zero, the engagement is released such that the variable inertia clutch 462 enters the disengaged condition, and as the engagement force increases, the variable inertia clutch 462 passes through a half engaged condition (a slip condition) and eventually reaches a fully engaged condition. Here, the extension shaft 461 is divided into a rotary body 30 side and a rotary body 463 side. The rotary member 462a is a member that rotates integrally with the part of the divided extension shaft 461 on the rotary body 30 side. The rotary member 462b, meanwhile, is a member that rotates integrally with the part of the divided extension shaft 461 on the rotary body 463 side. The variable inertia clutch 462 is controlled by the ECU 11.

Hence, by having the ECU 11 control the variable inertia clutch 462 of the variable inertial mass apparatus 460 to switch the variable inertia clutch 462 between the engaged condition and the disengaged condition, the inertial mass of the vibration reduction apparatus main body 420 can be made variable. Here, the inertial mass can be modified in at least two stages. When the variable inertia clutch 462 of the variable inertial mass apparatus 460 is set in the engaged condition, the rotary body (a second inertial mass body) 463 is connected to the rotary body (a first inertial mass body) 30, and as a result, the essential inertial mass can be relatively increased. Further, when the variable inertia clutch 462 of the variable inertial mass apparatus 460 is set in the disengaged condition, the rotary body 463 is disconnected from the rotary body 30, and as a result, the essential inertial mass can be relatively reduced.

In the vehicle vibration reduction apparatus 401 configured as described above, when the first path 42 is selected by the switching apparatus 440, the rotary body 30 can be used as the dynamic damper inertial mass body, or in other words, the vibration reduction apparatus main body 420 functions as a dynamic damper. When, on the other hand, the second path 43 is selected by the switching apparatus 440, the rotary body 30 of the vehicle vibration reduction apparatus 401 can be used as the resonance point adjusting inertial mass body. In other words, the vibration reduction apparatus main body 420 functions as a resonance point adjustment apparatus.

The ECU 11 performs control to switch the vibration reduction apparatus main body 420 between its function as a resonance point adjustment apparatus and its function as a dynamic damper in accordance with the condition of the vehicle 2 by controlling the switching apparatus 440 to switch between the first path 42 and the second path 43 in accordance with the operating condition. Here, the ECU 11 is capable of realizing the dynamic damper mode, the resonance point adjustment mode, and the disconnection mode.

Further, by controlling the switching apparatus 440 in accordance with the operating condition, the ECU 11 can modify the speed ratio of the rotary force transmitted to the rotary body 30 in two stages in both the dynamic damper mode and the resonance point adjustment mode.

Furthermore, by controlling the variable inertial mass apparatus 460 in accordance with the operating condition, the ECU 11 can modify the inertial mass of the rotary body 30 (the vibration reduction apparatus main body 420) in at least two stages in both the dynamic damper mode and the resonance point adjustment mode.

Hence, in the dynamic damper mode, the ECU 11 can realize four vibration modes having different characteristics by combining the speed ratio that can be modified in two stages and the inertial mass of the rotary body 30 that can be modified in the two stages. Likewise in the resonance point adjustment mode, the ECU 11 can realize four vibration modes having different characteristics by combining the speed ratio that can be modified in two stages and the inertial mass of the rotary body 30 that can be modified in the two stages.

The ECU 11 can thus realize various vibration reduction modes by controlling the switching apparatus 440 and the variable inertial mass apparatus 460 in accordance with the operating condition. In other words, the ECU 11 can control the switching apparatus 440 to select an optimum mode for the current travel conditions of the vehicle 2 from a total of nine vibration reduction modes, namely the four dynamic damper modes having different characteristics, the four resonance point adjustment modes having different characteristics, and the disconnection mode. As a result, the vibration reduction performance of the vehicle vibration reduction apparatus 401 can be optimized over an even wider operating region in accordance with the condition of the vehicle 2, enabling a further improvement in the vibration reduction performance.

For example, when the gear position 81 is selected by the main transmission 8, the ECU 11 causes the vibration reduction apparatus main body 420 to function as a dynamic damper by having the switch mechanism 448 select the first drive gear 444 and having the switch mechanism 449 select the second driven gear 447. When the gear position 82 is selected by the main transmission 8, the ECU 11 causes the vibration reduction apparatus main body 420 to function as a dynamic damper by having the switch mechanism 448 select the second drive gear 445 and having the switch mechanism 449 select the first driven gear 446. When the gear position 83 is selected by the main transmission 8, the ECU 11 causes the vibration reduction apparatus main body 420 to function as a resonance point adjustment apparatus by having the switch mechanism 448 select the first drive gear 444 and having the switch mechanism 449 select the first driven gear 446. When the gear position 85 is selected by the main transmission 8, the ECU 11 causes the vibration reduction apparatus main body 420 to function as a resonance point adjustment apparatus by having the switch mechanism 448 select the second drive gear 445 and having the switch mechanism 449 select the second driven gear 447. By controlling the variable inertial mass apparatus 460, the ECU 11 can modify the inertial mass of the rotary body 30 (the vibration reduction apparatus main body 420) in two stages in each of these conditions.

In the vehicle vibration reduction apparatus 401 according to the embodiment described above, the connection path (the power transmission path) between the transmission input shaft 13 and the rotary body 30 can be switched between the first path 42 and the second path 43 by the switching apparatus 440 in accordance with the condition of the vehicle 2. Accordingly, the vehicle vibration reduction apparatus 401 can use the single rotary body 30 separately as a resonance point adjustment apparatus and a dynamic damper, and therefore the vibration reduction performance of the apparatus can be improved while suppressing increases in the size and weight thereof. As a result, improvements in the ease with which the vehicle vibration reduction apparatus 401 is installed in the vehicle 2 as well as the fuel efficiency and the operating performance of the vehicle 2 can be achieved while reducing vibration appropriately so that comfortable travel can be realized in the vehicle 2.

Fifth Embodiment

Figure 7:
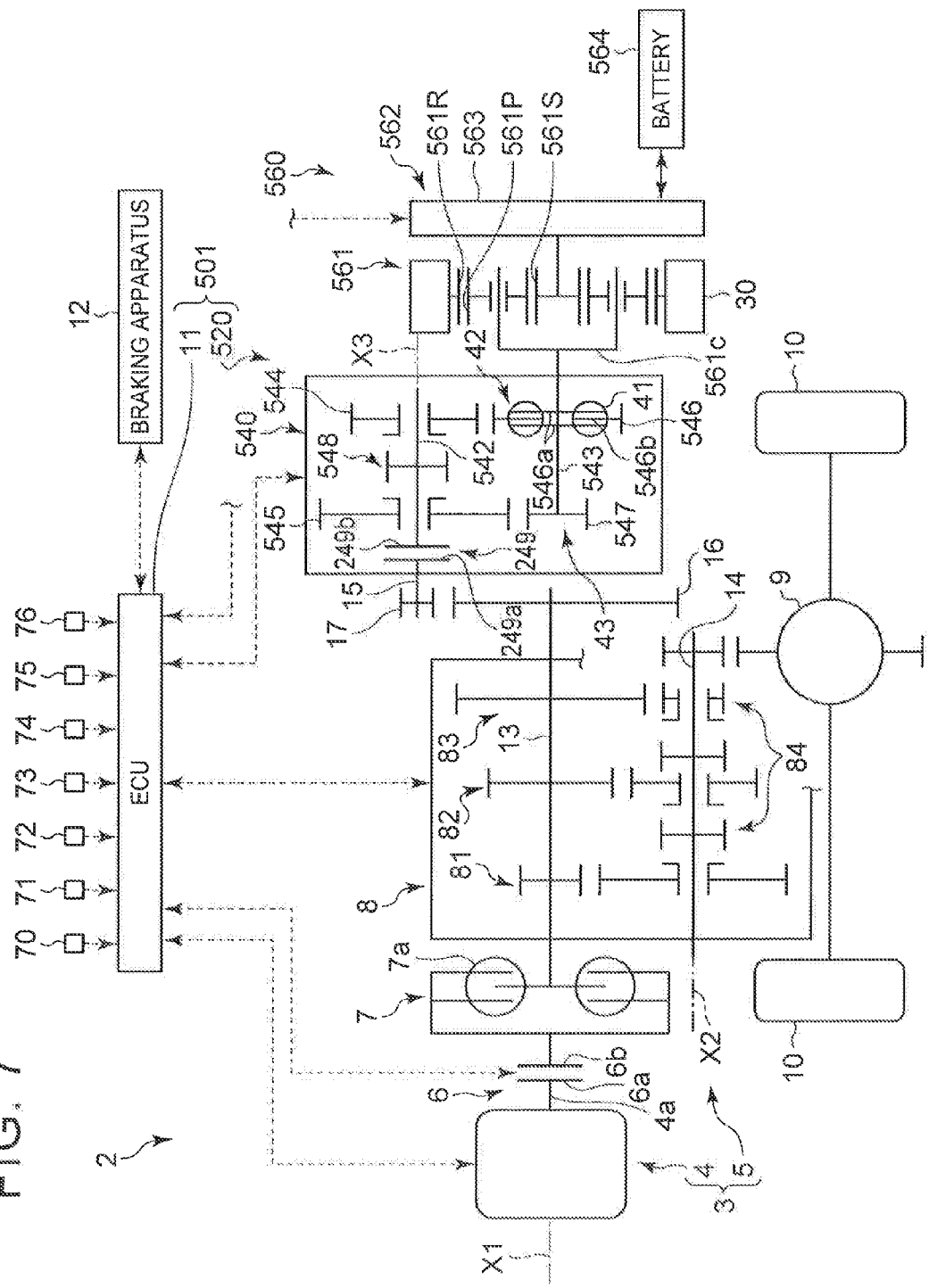
FIG. 7 is a schematic view showing a configuration of a vehicle vibration reduction apparatus according to a fifth embodiment.

FIG. 7 is a schematic view showing a configuration of a vehicle vibration reduction apparatus according to a fifth embodiment. The vehicle vibration reduction apparatus according to the fifth embodiment differs from that of the fourth embodiment in the configuration of the switching apparatus and the variable inertial mass apparatus.

A vehicle vibration reduction apparatus 501 according to this embodiment, shown in FIG. 7, includes a vibration reduction apparatus main body 520, and the ECU 11 serving as a control apparatus that controls the vibration reduction apparatus main body 520. The vibration reduction apparatus main body 520 includes the reduction apparatus rotary shaft 15, the rotary body 30, a switching apparatus 540, and a variable inertial mass apparatus 560. The switching apparatus 540 is capable of switching between the first path 42 and the second path 43. The variable inertial mass apparatus 560 controls the inertial mass of the rotary body 30 variably.

Here, the vibration reduction apparatus main body 520 according to this embodiment includes a drive gear 16 and a driven gear 17 having a smaller number of teeth than the drive gear 16. The drive gear 16 is joined to the transmission input shaft 13 to be capable of rotating integrally therewith. The driven gear 17 is joined to the reduction apparatus rotary shaft 15 to be capable of rotating integrally therewith, and meshes with the drive gear 16. The drive gear 16 and the driven gear 17 function as a speed increasing gear that increases a speed of the rotary power transmitted to the rotary body 30 from the transmission input shaft 13. The rotary power transmitted to the transmission input shaft 13 from the engine 4 or the drive wheels 10 is input into (transmitted to) the reduction apparatus rotary shaft 15 via the drive gear 16 and the driven gear 17. At this time, the power transmitted to the reduction apparatus rotary shaft 15 from the transmission input shaft 13 is increased in speed in accordance with a speed ratio (a gear ratio) between the drive gear 16 and the driven gear 17, and then transmitted to the rotary body 30 side.

The switching apparatus 540 according to this embodiment includes the spring 41, an input shaft 542, an output shaft 543, a first drive gear 544, a second drive gear 545, a first driven gear 546, a second driven gear 547, a switch mechanism 548, and the reduction apparatus clutch 249. The input shaft 542 is a rotary member of the switching apparatus 540 into which the rotary power from the engine 4 and so on is input. The output shaft 543 is a rotary member of the switching apparatus 540 that outputs the rotary power to the rotary body 30 side. The input shaft 542 is capable of rotating about the rotary axis X3 when power is transmitted thereto. The output shaft 543 is capable of rotating substantially coaxially with the rotary axis X1 when power is transmitted thereto. The input shaft 542 is connected to the transmission input shaft 13 via the reduction apparatus clutch 249 and so on to be capable of power transmission.

Here, the reduction apparatus clutch 249 according to this embodiment is capable of switching between a condition in which the transmission input shaft 13 and the rotary body 30 are engaged to be capable of power transmission and a condition in which the engagement between the transmission input shaft 13 and the rotary body 30 is released by switching the reduction apparatus rotary shaft 15 and the input shaft 542 between an engaged condition in which power can be transmitted between the reduction apparatus rotary shaft 15 and the input shaft 542 and a disengaged condition in which the engagement between the reduction apparatus rotary shaft 15 and the input shaft 542 is released. In this case, the rotary member 249a is a member that rotates integrally with the reduction apparatus rotary shaft 15, while the rotary member 249b is a member that rotates integrally with the input shaft 542.

The first drive gear 544 and the second drive gear 545 are annular plate-shaped members disposed coaxially with the rotary axis X3. The first drive gear 544 and the second drive gear 545 are disposed such that the input shaft 542 is inserted into the radial direction inner side thereof. The first drive gear 544 and the second drive gear 545 are supported on the input shaft 542 via a bush or the like to be capable of relative rotation about the rotary axis X3. The first drive gear 544 and the second drive gear 545 are formed with different numbers of teeth. Here, the number of teeth of the first drive gear 544 is relatively small, while the number of teeth of the second drive gear 545 is relatively large.

The first driven gear 546 and the second driven gear 547 are annular plate-shaped members disposed coaxially with the rotary axis X1. The first driven gear 546 and the second driven gear 547 are joined to be capable of rotating integrally with the output shaft 543. The first driven gear 546 and the second driven gear 547 are formed to have different numbers of teeth, and here, the number of teeth of the first driven gear 546 is relatively large, while the number of teeth of the second driven gear 547 is relatively small. Here, the first driven gear 546 is formed with a smaller number of teeth than the first drive gear 544, and the second driven gear 547 is formed with a smaller number of teeth than the second drive gear 545. The output shaft 543, the variable inertial mass apparatus 560 to be described below, and so on are disposed such that the first driven gear 546 meshes with the first drive gear 544 and the second driven gear 547 meshes with the second drive gear 545.

The first driven gear 546 holds the spring 41 in the rotation direction. A plurality of springs 41 are held in the circumferential direction by the first driven gear 546. The first driven gear 546 is divided into an inner diameter portion 546a positioned on the radial direction inner side and an outer diameter portion 546b positioned on a radial direction outer side, and the spring 41 is held between the inner diameter portion 546a and the outer diameter portion 546b relative to the circumferential direction. Gear teeth are formed in the outer diameter portion 546b of the first driven gear 546. The plurality of springs 41 are held so as to be interposed between the inner diameter portion 546a and the outer diameter portion 546b relative to the rotation direction (the circumferential direction), and when power is transmitted thereto, the plurality of springs 41 elastically deform in accordance with the magnitude of the transmitted power.

The switch mechanism 548 is constituted by a synchromesh mechanism or the like that joins one of the first drive gear 544 and the second drive gear 545 selectively to the transmission input shaft 13. When an engagement member of the switch mechanism 548 moves to the first position (the spring engagement position), the first drive gear 544 is joined to the transmission input shaft 13 while a joint between the second drive gear 545 and the transmission input shaft 13 is released such that the second drive gear 545 enters an idling condition. When the engagement member of the switch mechanism 548 moves to the second position (the rigid engagement position), the second drive gear 545 is joined to the transmission input shaft 13 while a joint between the first drive gear 544 and the transmission input shaft 13 is released such that the first drive gear 544 enters an idling condition. When the engagement member of the switch mechanism 548 moves to the third position (the disengaged position), the joints between the transmission input shaft 13 and both the first drive gear 544 and the second drive gear 545 are released such that both the first drive gear 544 and the second drive gear 545 enter the idling condition. The switch mechanism 548 is controlled by the ECU 11.

In the switching apparatus 540 configured as described above, when the switch mechanism 548 is controlled by the ECU 11 such that the engagement member moves to the first position (the spring engagement position), the first path 42 on which the transmission input shaft 13 and the rotary body 30 are connected via the spring 41 is selected. In other words, rotary power that is transmitted to the transmission input shaft 13 from the engine 4 or the drive wheels 10 and then transmitted to the input shaft 542 via the drive gear 16, the driven gear 17, the reduction apparatus rotary shaft 15, and the reduction apparatus clutch 249 is input into (transmitted to) the output shaft 543 via the first drive gear 544, the outer diameter portion 546b of the first driven gear 546, the spring 41, and the inner diameter portion 546a of the first driven gear 546, in that order, and then transmitted to the rotary body 30 via the variable inertial mass apparatus 560 to be described below. In other words, in this case, the first path 42 is constituted by the first drive gear 544, the outer diameter portion 546b of the first driven gear 546, the spring 41, and the inner diameter portion 546a of the first driven gear 546.

When, on the other hand, the switch mechanism 548 of the switching apparatus 540 is controlled by the ECU 11 such that the engagement member moves to the second position (the rigid engagement position), the second path 43 on which the transmission input shaft 13 and the rotary body 30 are connected without passing through the spring 41, or in other words so as to bypass the spring 41, is selected. In other words, the rotary power transmitted to the input shaft 542 is input into (transmitted to) the output shaft 543 via the second drive gear 545 and the second driven gear 547, in that order, and then transmitted to the rotary body 30 via the variable inertial mass apparatus 560 to be described below. In other words, in this case, the second path 43 is constituted by the second drive gear 545 and the second driven gear 547.

Furthermore, by having the ECU 11 control the switch mechanism 548 of the switching apparatus 540 such that the engagement member moves to the third position (the disengaged position), the connection between the transmission input shaft 13 and the rotary body 30 is released. In this case, the switching apparatus 540 can establish a condition in which power transmission between the transmission input shaft 13 and the rotary body 30 is blocked.

The variable inertial mass apparatus 560 according to this embodiment is a speed change apparatus that speed-shifts the rotary power from the transmission input shaft 13 and transmits the speed-shifted rotary power to the rotary body 30, and varies the inertial mass of the rotary body 30 by modifying a speed ratio at which the rotary power transmitted from the transmission input shaft 13 to the rotary body 30 is speed-shifted so as to adjust the rotation of the rotary body 30. Note that in the following description, unless specified otherwise, cases in which the inertial mass of the inertial mass body is varied include a case in which an apparent inertial mass is varied by varying the rotation of the inertial mass body.

The variable inertial mass apparatus 560 includes a planetary gear mechanism 561 that includes a plurality of rotary elements capable of differential rotation, the rotary body 30 being provided on one of the plurality of rotary elements, and a rotation control apparatus 562 that controls rotation of the rotary elements of the planetary gear mechanism 561. The rotation control apparatus 562 of the variable inertial mass apparatus 560 is controlled by the ECU 11 to control the rotation of the rotary elements of the planetary gear mechanism 561, whereby the speed ratio of the rotary power transmitted to the rotary body 30 is modified. Accordingly, the rotation of the rotary body 30 is adjusted, and as a result, the inertial mass of the rotary body 30 is varied.

In the vibration reduction apparatus main body 520, one of the plurality of rotary elements of the planetary gear mechanism 561 in the variable inertial mass apparatus 560 employing the planetary gear mechanism 561 serves as an input element into which the power from the engine 4 or the drive wheels 10 is input, and another rotary element serves as a rotation control element.

In the vibration reduction apparatus main body 520, the planetary gear mechanism 561 is connected to the output shaft 543. Further, in the vibration reduction apparatus main body 520, the respective rotary elements and so on of the planetary gear mechanism 561 also act as inertial mass bodies, or in other words inertial mass members for generating a moment of inertia.

In the planetary gear mechanism 561, respective rotary centers of the rotary elements that are capable of differential rotation with each other are disposed coaxially with the rotary axis X1. The planetary gear mechanism 561 is a so-called single pinion type planetary gear mechanism that includes, as the rotary elements, a sun gear 561S, a ring gear 561R, and a carrier 561C. The sun gear 561S is an external gear. The ring gear 561R is an internal gear disposed coaxially with the sun gear 561S. The carrier 561C holds a plurality of pinion gears 561P that mesh with the sun gear 561S or the ring gear 561R—here both the sun gear 561S and the ring gear 561R—to be capable of revolving and rotating.

In the planetary gear mechanism 561 according to this embodiment, the carrier 561C serves as a first rotary element corresponding to the aforesaid input element, the sun gear 561S serves as a second rotary element corresponding to the aforesaid rotation control element, and the ring gear 561R serves as a third rotary element corresponding to a mass element on which the rotary body 30 is disposed.

The carrier 561C is formed in an annular disc shape, and supports the pinion gears 561P serving as external gears on a pinion shaft to be capable of revolving and rotating. The carrier 561C serves as an input member of the planetary gear mechanism 561. The carrier 561C is connected to the transmission input shaft 13 to be capable of power transmission via the switching apparatus 540, the reduction apparatus rotary shaft 15, the driven gear 17, and the drive gear 16. The power transmitted from the engine 4 or the like to the transmission input shaft 13 is transmitted to (input into) the carrier 561C via the drive gear 16, the driven gear 17, the reduction apparatus rotary shaft 15, the switching apparatus 540, and so on. The ring gear 561R is formed in an annular plate shape, and a gear is formed on an inner peripheral surface thereof. The sun gear 561S is formed in a cylindrical shape, and a gear is formed on an outer peripheral surface thereof. The ring gear 561R is connected to the rotary body 30 to be capable of rotating integrally therewith, and a motor 563 of the rotation control apparatus 562 is connected to the sun gear 561S. Here, the rotary body 30 is formed in an annular shape and joined to the ring gear 561R to be capable of rotating integrally therewith about the rotary axis X1.

The rotation control apparatus 562 is an apparatus for controlling the rotation of the rotary elements of the planetary gear mechanism 561, and includes the motor 563 serving as a speed control apparatus, a battery 564, and so on. The motor 563 is connected to the sun gear 561S to control the rotation of the sun gear 561S. A stator of the motor 563 is fixed to a case or the like, and a rotor of the motor 563 is disposed on the radial direction inner side of the stator and joined to the sun gear 561S to be capable of rotating integrally therewith. The motor 563 is a rotating electric machine that functions as both a motor that converts electric power supplied from the battery 564 via an inverter or the like into mechanical power (a power running function) and a power generator that converts the input mechanical power into electric power and charges the battery 564 with the electric power via an inverter or the like (a regeneration function). The motor 563 can control the rotation (the speed) of the sun gear 561S by driving the rotor to rotate. The ECU 11 controls driving of the motor 563.

The variable inertial mass apparatus 560 configured as described above can be caused to variably control the apparent inertial mass of the planetary gear mechanism 561, which includes the rotary body 30 serving as the inertial mass body, by having the ECU 11 control driving (vibration damping) of the motor 563 of the rotation control apparatus 562.

In the vehicle vibration reduction apparatus 501 configured as described above, when the first path 42 is selected by the switching apparatus 540, the rotary body 30 can be used as the dynamic damper inertial mass body, or in other words, the vibration reduction apparatus main body 520 functions as a dynamic damper. When the second path 43 is selected by the switching apparatus 540, on the other hand, the rotary body 30 of the vehicle vibration reduction apparatus 501 can be used as the resonance point adjusting inertial mass body. In other words, the vibration reduction apparatus main body 520 functions as a resonance point adjustment apparatus.

The ECU 11 performs control to switch the vibration reduction apparatus main body 520 between its function as a resonance point adjustment apparatus and its function as a dynamic damper in accordance with the condition of the vehicle 2 by controlling the switching apparatus 540 to switch between the first path 42 and the second path 43 in accordance with the operating condition. Here, the ECU 11 is capable of realizing the dynamic damper mode in which the engagement member of the switch mechanism 548 is in the first position (the spring engagement position), the resonance point adjustment mode in which the engagement member of the switch mechanism 548 is in the second position (the rigid engagement position), and the disconnection mode in which the engagement member of the switch mechanism 548 is in the third position (the disengaged position).

Further, the ECU 11 can adjust the rotation of the rotary body 30 so as to vary the inertial mass of the rotary body 30 by controlling the variable inertial mass apparatus 560 in accordance with the operating condition to modify the speed ratio of the rotary power transmitted to the rotary body 30 in the dynamic damper mode and the resonance point adjustment mode. Thus, the ECU 11 can realize more varied vibration reduction modes, whereby the vibration reduction performance of the vehicle vibration reduction apparatus 501 can be optimized over a wider operating region in accordance with the conditions of the vehicle 2, and as a result, the vibration reduction performance can be improved even further.

For example, in the resonance point adjustment mode, the variable inertial mass apparatus 560 of the vehicle vibration reduction apparatus 501 varies the inertial mass of the rotary body 30 such that the inertial mass on the driven side is adjusted. In so doing, the vehicle vibration reduction apparatus 501 can reduce the resonance point between the drive side and the driven side (the resonance point of the power train 3), which varies in accordance with operating conditions such as the rotation speed and the engine torque of the engine 4, and as a result, resonance can be suppressed effectively.

At this time, the vehicle vibration reduction apparatus 501 performs resonance point adjustment control by having the ECU 11 control the variable inertial mass apparatus 560. Here, the vehicle vibration reduction apparatus 501 performs the resonance point adjustment control by having the ECU 11 control driving of the motor 563 of the rotation control apparatus 562, rotation of the planetary gear mechanism 561, and the speed ratio of the variable inertial mass apparatus 560. In so doing, the vehicle vibration reduction apparatus 501 can set the inertial mass of the vibration reduction apparatus main body 520 appropriately, and as a result, vibration can be reduced appropriately over a wider operating region.

More specifically, the vehicle vibration reduction apparatus 501 variably controls the rotation of the sun gear 561S by having the ECU 11 control driving of the motor 563. Thus, the vehicle vibration reduction apparatus 501 varies the rotation of the rotary elements of the planetary gear mechanism 561, such as the sun gear 561S and the ring gear 561R, and the rotary body 30, thereby varying an inertial force acting on the inertial mass bodies including the sun gear 561S, the ring gear 561R, the rotary body 30, and so on. In so doing, the vehicle vibration reduction apparatus 501 performs inertial mass control for variably controlling the apparent inertial mass of the inertial bodies. For example, in the vehicle vibration reduction apparatus 501, by increasing the rotation speed of the rotary body 30, which is a comparatively large inertial mass body, the apparent inertial mass of the inertial mass bodies is increased, and as a result, an equal effect to that obtained by actually increasing the inertial mass can be obtained. Using this phenomenon, the vehicle vibration reduction apparatus 501 can adjust the inertial mass on the driven side so as to modify the resonance point, and as a result, the vibration reduction characteristic of the vibration reduction apparatus main body 20 can be modified. By controlling driving of the motor 563 so as to increase the inertial mass of the rotary body 30, for example, the vehicle vibration reduction apparatus 501 can increase the inertial mass on the driven side, thereby reducing the resonance frequency on the driven side, and as a result, the resonance point of the power train 3 can be reduced.

Note that an overall inertial mass of the vibration reduction apparatus main body 520 includes the actual inertial mass of the inertial mass bodies (the rotary body 30, the planetary gear mechanism 561, the rotation control apparatus 562, the switching apparatus 540, and so on) of the vibration reduction apparatus main body 520, an overall inertial mass speed term, an overall inertial mass torque term, and so on. The overall inertial mass speed term is an apparent inertial mass generated by varying the respective rotation speeds of all of the rotary elements and the rotary body 30 in the planetary gear mechanism 561. In other words, the overall inertial mass speed term is the overall apparent inertial mass of the planetary gear mechanism 561 generated by the rotation speed control of the motor 563. The overall inertial mass torque term is an apparent inertial mass generated by torque acting when the rotation speeds of the respective rotary elements of the planetary gear mechanism 561 are varied. In other words, the overall inertial mass torque term is the overall apparent inertial mass of the planetary gear mechanism 561 generated by torque control of the motor 563.

Hence, in the vehicle vibration reduction apparatus 501, by having the ECU 11 execute rotation control on the planetary gear mechanism 561 by controlling driving of the motor 563 in order to adjust the overall inertial mass, the inertial mass of the vibration reduction apparatus main body 520 can be adjusted appropriately in accordance with the vibration generated by the power train 3. The ECU 11 controls driving of the motor 563 on the basis of a target control amount, for example. Here, the target control amount is a control amount corresponding to the vibration mode, which is determined by a number of resonance points of the power train 3, the resonance frequencies thereof, and so on, which vary in accordance with the current engine rotation speed, engine torque, gear position, and so on. The target control amount is, for example, a target motor rotation speed at which a reduction in the vibration generated by the power train 3 in each vibration mode can be realized by adjusting the rotation (the inertial mass) of the rotary body 30 and the like so as to reduce the resonance point.

With the vehicle vibration reduction apparatus 501, therefore, even when the resonance point (the resonance frequency) of the power train 3 varies in the resonance point adjustment mode in response to a shift by the main transmission 8 or variation in the engine rotation speed and the engine torque, for example, the inertial mass of the vibration reduction apparatus main body 520 can be adjusted to an appropriate inertial mass, enabling adjustment of the resonance point, and as a result, an efficiency of the power train 3 and vibration noise can be controlled to optimum levels.

Further, in the dynamic mode, for example, the variable inertial mass apparatus 560 of the vehicle vibration reduction apparatus 501 adjusts the inertial mass by varying the inertial mass of the rotary body 30. At this time, the vehicle vibration reduction apparatus 501 performs vibration damping control by having the ECU 11 control driving of the motor 563 of the rotation control apparatus 562 to control the rotation of the planetary gear mechanism 561, thereby controlling the speed ratio of the variable inertial mass apparatus 560. Accordingly, the opposite phase vibration of the vibration reduction apparatus main body 520 can be set appropriately in accordance with the vibration generated by the power train 3, and as a result, the vehicle vibration reduction apparatus 501 can reduce vibration appropriately over a wider operating region.

More specifically, the vehicle vibration reduction apparatus 501 variably controls the rotation of the sun gear 561S by having the ECU 11 control driving of the motor 563. Thus, the vehicle vibration reduction apparatus 501 varies the rotation of the rotary elements of the planetary gear mechanism 561, such as the sun gear 561S and the ring gear 561R, and the rotary body 30, thereby varying the inertial force acting on the inertial mass bodies including the sun gear 561S, the ring gear 561R, the rotary body 30, and so on. In so doing, the vehicle vibration reduction apparatus 501 performs inertial mass control for variably controlling the apparent inertial mass of the inertial bodies. Through this control, the vehicle vibration reduction apparatus 501 can modify the resonance point in relation to a fixed spring constant, thereby modifying the natural frequency of the vibration reduction apparatus main body 220, and as a result, the damper characteristic can be modified.

A natural frequency fa of the vibration reduction apparatus main body 520 can be expressed by Equation (1), shown below, using a spring constant Kd of the spring 41 and an overall inertial mass Ia of the inertial mass bodies of the vibration reduction apparatus main body 520, for example.

$$fa=(\sqrt{(Kd/Ia)})/2\pi \quad (1)$$

Hence, by having the ECU 11 control driving of the motor 563, the vehicle vibration reduction apparatus 501 can execute rotation control on the planetary gear mechanism 561 in order to adjust the overall inertial mass Ia, and as a result, the natural frequency fa of the vibration reduction apparatus main body 520 can be adjusted appropriately in accordance with the vibration generated by the power train 3. The ECU 11 controls driving of the motor 563 on the basis of the target control amount, for example. The target control amount is a target motor rotation speed at which a natural frequency fa enabling a reduction in the vibration of the power train 3 in each vibration mode can be realized using an anti-resonance principle in the vibration reduction apparatus main body 520 by adjusting the rotation (the inertial mass) of the rotary body 30 and the like, for example.

With the vehicle vibration reduction apparatus 501, therefore, even when the resonance point (the resonance frequency) of the power train 3 varies in the dynamic damper mode in response to a shift by the main transmission 8 or variation in the engine rotation speed and the engine torque, for example, the natural frequency fa of the vibration reduction apparatus main body 520 can be adjusted to an appropriate natural frequency fa such that an appropriate damper characteristic is realized, and as a result, the efficiency of the power train 3 and vibration noise can be controlled to optimum levels.

In the vehicle vibration reduction apparatus 501 according to the embodiment described above, the connection path (the power transmission path) between the transmission input shaft 13 and the rotary body 30 can be switched between the first path 42 and the second path 43 by the switching apparatus 540 in accordance with the condition of the vehicle 2. Hence, the vehicle vibration reduction apparatus 501 can use the single rotary body 30 separately as a resonance point adjustment apparatus and a dynamic damper, and therefore the vibration reduction performance of the apparatus can be improved while suppressing increases in the size and weight thereof. As a result, improvements in the ease with which the vehicle vibration reduction apparatus 501 is installed in the vehicle 2 as well as the fuel efficiency and the operating performance of the vehicle 2 can be achieved while reducing vibration appropriately so that comfortable travel can be realized in the vehicle 2.

Note that in the vehicle vibration reduction apparatus 501 described above, the rotary body 30, the variable inertial mass apparatus 560, and so on are capable of rotating coaxially with the rotary axis X1 of the transmission input shaft 13. In the vehicle vibration reduction apparatus 501, therefore, the vibration reduction apparatus main body 520 including the rotary body 30, the variable inertial mass apparatus 560, and so on can be appended easily to the transmission input shaft 13, enabling a further improvement in the ease with which the vehicle vibration reduction apparatus 501 is installed in the power transmission apparatus 5 of the vehicle 2.

Sixth Embodiment

Figure 8:
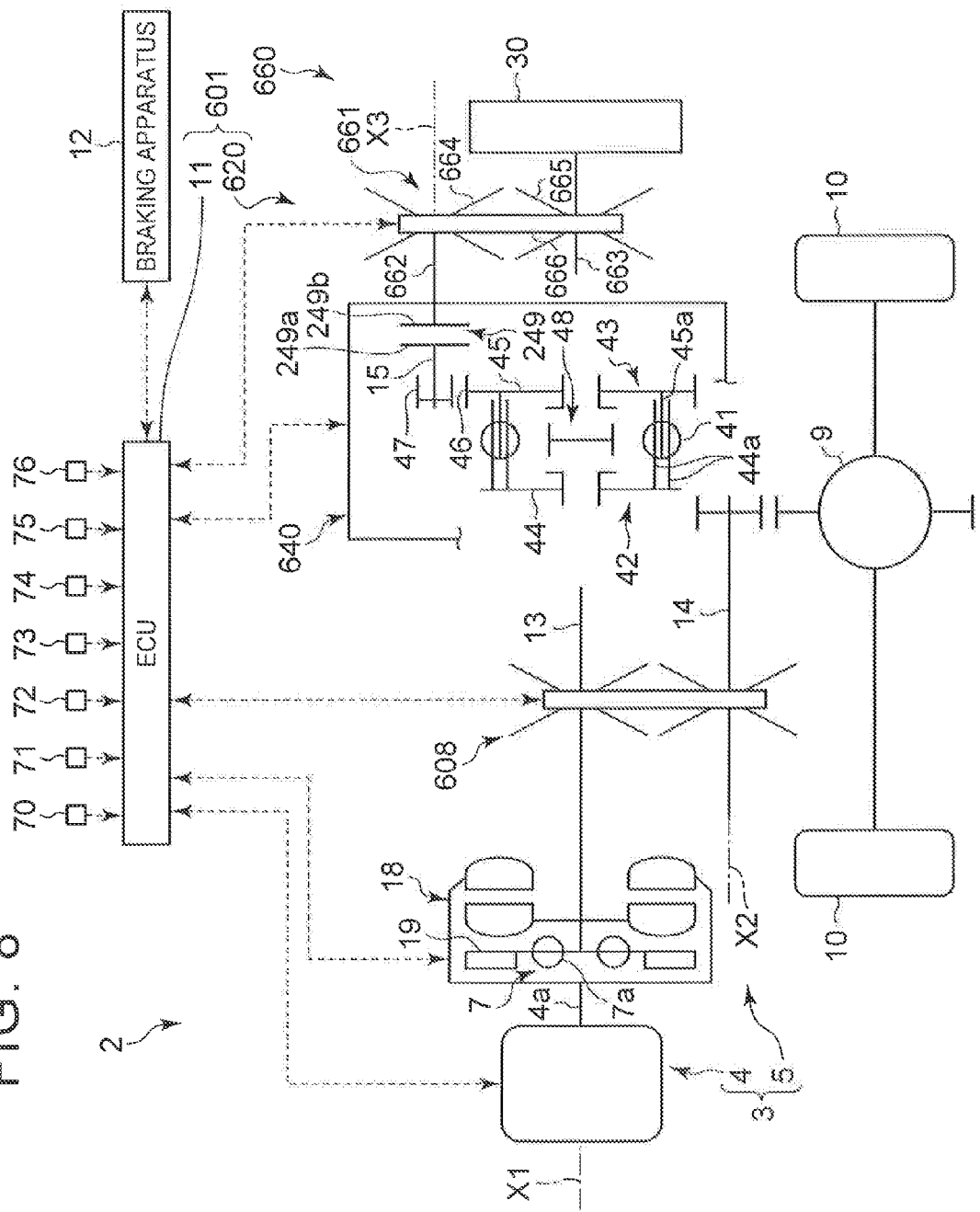
FIG. 8 is a schematic view showing a configuration of a vehicle vibration reduction apparatus according to a sixth embodiment.

FIG. 8 is a schematic view showing a configuration of a vehicle vibration reduction apparatus according to a sixth embodiment. The vehicle vibration reduction apparatus according to the sixth embodiment differs from those of the fourth and fifth embodiments in the configurations of the switching apparatus and the variable inertial mass apparatus.

A vehicle vibration reduction apparatus 601 according to this embodiment, shown in FIG. 8, includes a vibration reduction apparatus main body 620, and the ECU 11 serving as a control apparatus that controls the vibration reduction apparatus main body 620. The vibration reduction apparatus main body 620 includes the reduction apparatus rotary shaft 15, the rotary body 30, a switching apparatus 640, and a variable inertial mass apparatus 660. The switching apparatus 640 is capable of switching between the first path 42 and the second path 43. The variable inertial mass apparatus 660 controls the inertial mass of the rotary body 30 variably.

Here, the power transmission apparatus 5 according to this embodiment is formed by incorporating the damper 7 into the lockup clutch 19 of the torque converter 18 provided on the power transmission path between the engine 4 and a main transmission 608. Further, the main transmission 608 according to this embodiment is constituted by a belt type CVT of a similar type to a CVT 661 to be described below.

The switching apparatus 640 according to this embodiment includes the spring 41, the first rotary member 44, the second rotary member 45, the drive gear 46, the driven gear 47, the switch mechanism 48, and the reduction apparatus clutch 249. The spring 41, the first rotary member 44, the second rotary member 45, the drive gear 46, the driven gear 47, and the switch mechanism 48 are configured substantially identically to those of the switching apparatus 40 (see FIG. 1) described above. Further, the reduction apparatus clutch 249 according to this embodiment is capable of switching between a condition in which the transmission input shaft 13 and the rotary body 30 are engaged to be capable of power transmission and a condition in which the engagement between the transmission input shaft 13 and the rotary body 30 is released by switching the reduction apparatus rotary shaft 15 and an input shaft 662 of the CVT 661 between an engaged condition in which power can be transmitted between the reduction apparatus rotary shaft 15 and the input shaft 662 and a disengaged condition in which the engagement between the reduction apparatus rotary shaft 15 and the input shaft 662 is released. In this case, the rotary member 249a is a member that rotates integrally with the reduction apparatus rotary shaft 15, while the rotary member 249b is a member that rotates integrally with the input shaft 662.

The variable inertial mass apparatus 660 is a speed change apparatus that speed-shifts the rotary power from the transmission input shaft 13 and transmits the speed-shifted rotary power to the rotary body 30, and varies the inertial mass of the rotary body 30 by modifying the speed ratio at which the rotary power transmitted from the transmission input shaft 13 to the rotary body 30 is speed-shifted so as to adjust the rotation of the rotary body 30.

The variable inertial mass apparatus 660 according to this embodiment is configured to include the CVT 661. The variable inertial mass apparatus 660 varies the inertial mass of the rotary body 30 by modifying the speed ratio used to speed-shift the rotary power transmitted from the transmission input shaft 13 to the rotary body 30—here a speed ratio of the CVT 661—so as to adjust the rotation of the rotary body 30.

The CVT 661 is a so-called belt type CVT provided on the power transmission path between the switching apparatus 640 and the rotary body 30. Operations of the CVT 661 are controlled by the ECU 11. The CVT 661 includes the input shaft 662, an output shaft 663, a primary pulley 664 joined to the input shaft 662 to be capable of rotating integrally therewith, a secondary pulley 665 joined to the output shaft 663 to be capable of rotating integrally therewith, and an endless belt 666 wrapped around the primary pulley 664 and the secondary pulley 665. The CVT 661 is capable of transmitting power input into the input shaft 662 from the primary pulley 664 to the secondary pulley 665 via the belt 666 and outputting the power from the output shaft 663, and of continuously modifying a speed ratio (=input rotation speed/output rotation speed) constituted by a rotation speed ratio between the input shaft 662 and primary pulley 664 and the output shaft 663 and secondary pulley 665.

The input shaft 662 is a rotary member of the CVT 661 into which rotary power is input from the engine 4 or the like. The output shaft 663 is a rotary member of the CVT 661 that outputs rotary power to the rotary body 30 side. The input shaft 662 is capable of rotating about the rotary axis X3 when power is transmitted thereto. The output shaft 663 is capable of rotating substantially coaxially with the rotary axis X1 when power is transmitted thereto. The input shaft 662 is connected to the transmission input shaft 13 via the switching apparatus 640 and so on to be capable of power transmission. The power transmitted to the transmission input shaft 13 from the engine 4 or the like is transmitted to (input into) the input shaft 662 via the switching apparatus 640 and so on. The output shaft 663 is joined to the rotary body 30 to be capable of rotating integrally therewith. In other words, the rotary body 30 is joined to the output shaft 663 to be capable of rotating integrally therewith about the rotary axis X1. The CVT 661 modifies the speed ratio continuously by performing shift operations in accordance with an oil pressure (a primary pressure and a secondary pressure) supplied to a primary sheave oil pressure chamber of the primary pulley 664 and a secondary sheave oil pressure chamber of the secondary pulley 665 from an oil pressure control apparatus or the like in response to control executed by the ECU 11.

The variable inertial mass apparatus 660 configured as described above can be caused to control the apparent inertial mass of the rotary body 30 serving as the inertial mass body variably by having the ECU 11 execute speed ratio control on the CVT 661.

The ECU 11 according to this embodiment modifies the speed ratio of the rotary power transmitted to the rotary body 30 in the dynamic damper mode and the resonance point adjustment mode by controlling the variable inertial mass apparatus 660 in accordance with the operating condition, and in so doing, the ECU 11 can adjust the rotation of the rotary body 30 such that the inertial mass of the rotary body 30 is varied. Thus, the ECU 11 can realize more varied vibration reduction modes, whereby the vibration reduction performance of the vehicle vibration reduction apparatus 601 can be optimized over a wider operating region in accordance with the conditions of the vehicle 2, and as a result, the vibration reduction performance can be improved even further.

In the vehicle vibration reduction apparatus 601, the ECU 11 controls the rotation of the output shaft 663 variably by controlling the speed ratio of the CVT 661. In the vehicle vibration reduction apparatus 601, therefore, the inertial force acting on the rotary body 30 is varied by varying the rotation of the rotary body 30. Thus, the vehicle vibration reduction apparatus 601 performs inertial mass control for variably controlling the apparent inertial mass of the inertial mass body, as described above. For example, the vehicle vibration reduction apparatus 601 can increase the inertial mass of the rotary body 30 by upshifting the speed ratio (in other words, reducing the speed ratio) of the CVT 661 through control executed by the ECU 11 so as to increase the rotation speed of the rotary body 30. Further, for example, the vehicle vibration reduction apparatus 601 can reduce the inertial mass of the rotary body 30 by downshifting the speed ratio (in other words, increasing the speed ratio) of the CVT 661 through control executed by the ECU 11 so as to reduce the rotation speed of the rotary body 30.

Hence, in the vehicle vibration reduction apparatus 601, by having the ECU 11 adjust the overall inertial mass by executing speed ratio control on the CVT 661, the inertial mass of the vibration reduction apparatus main body 20 can be adjusted appropriately in accordance with the vibration generated by the power train 3. As a result, with the vehicle vibration reduction apparatus 601, the efficiency of the power train 3 and vibration noise can be controlled to optimum levels even when the resonance point (the resonance frequency) of the power train 3 varies in the resonance point adjustment mode and the dynamic damper mode in response to a shift by the main transmission 8 or variation in the engine rotation speed and the engine torque, for example.

In the vehicle vibration reduction apparatus 601 according to the embodiment described above, the connection path (the power transmission path) between the transmission input shaft 13 and the rotary body 30 can be switched between the first path 42 and the second path 43 by the switching apparatus 640 in accordance with the condition of the vehicle 2. Hence, the vehicle vibration reduction apparatus 601 can use the single rotary body 30 separately as a resonance point adjustment apparatus and a dynamic damper, and therefore the vibration reduction performance of the apparatus can be improved while suppressing increases in the size and weight thereof. As a result, improvements in the ease with which the vehicle vibration reduction apparatus 601 is installed in the vehicle 2 as well as the fuel efficiency and the operating performance of the vehicle 2 can be achieved while reducing vibration appropriately so that comfortable travel can be realized in the vehicle 2.

Note that the CVT 661 is not limited to the belt type CVT described above, and may be a traction drive type transmission such as a toroidal CVT instead, for example.

Seventh Embodiment

Figure 9:
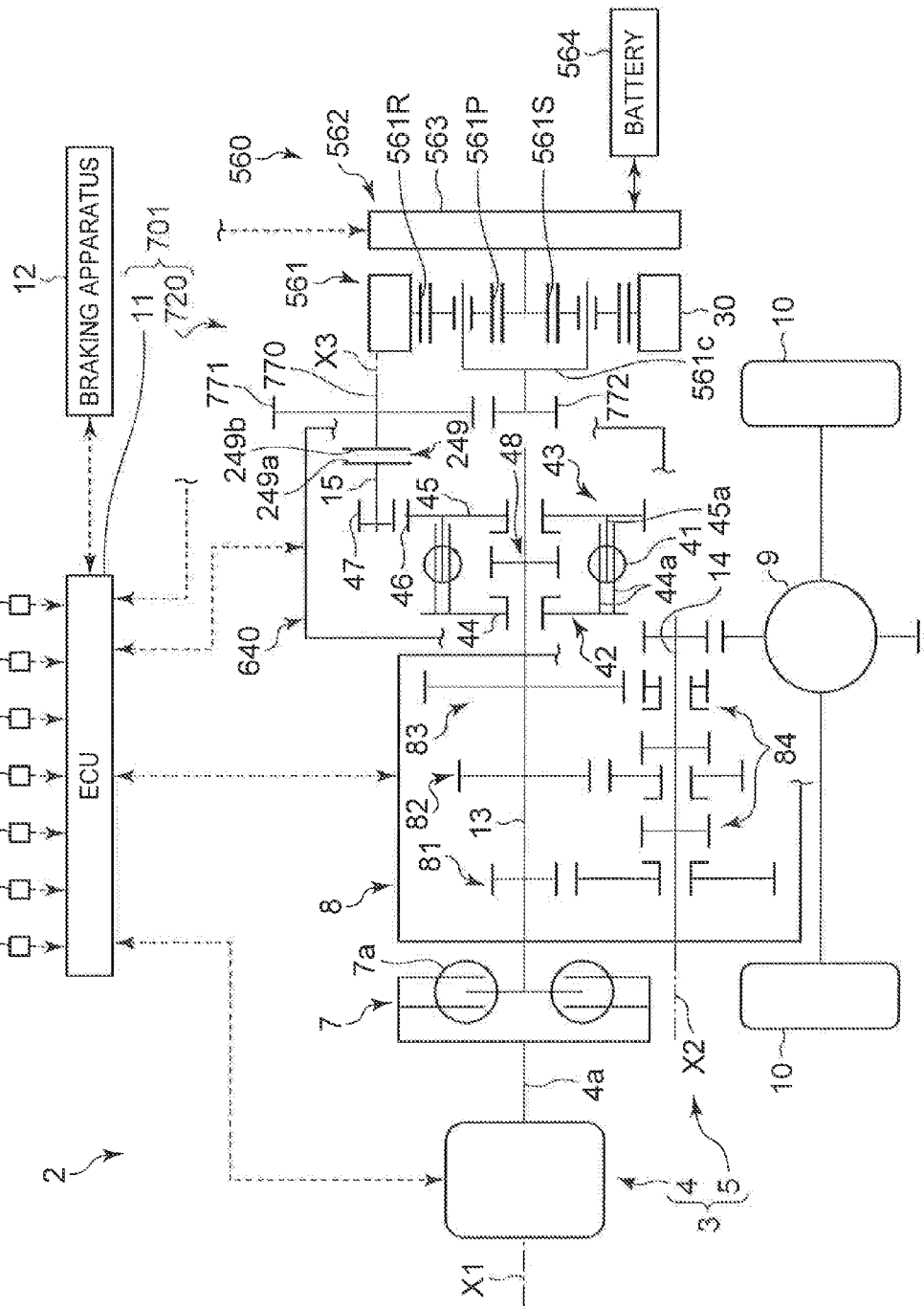
FIG. 9 is a schematic view showing a configuration of a vehicle vibration reduction apparatus according to a seventh embodiment.

FIG. 9 is a schematic view showing a configuration of a vehicle vibration reduction apparatus according to a seventh embodiment. The vehicle vibration reduction apparatus according to the seventh embodiment differs from those of the fourth, fifth, and sixth embodiments in the configurations of the switching apparatus and the variable inertial mass apparatus.

A vehicle vibration reduction apparatus 701 according to this embodiment, shown in FIG. 9, includes a vibration reduction apparatus main body 720, and the ECU 11 serving as a control apparatus that controls the vibration reduction apparatus main body 720. The vibration reduction apparatus main body 720 includes the reduction apparatus rotary shaft 15, the rotary body 30, the switching apparatus 640, the variable inertial mass apparatus 560, an intermediate shaft 770, a drive gear 771, and a driven gear 772. The switching apparatus 640 is capable of switching between the first path 42 and the second path 43. The variable inertial mass apparatus 560 controls the inertial mass of the rotary body 30 variably. Note that the power transmission apparatus 5 according to this embodiment is configured not to include the clutch 6.

The switching apparatus 640 according to this embodiment is configured substantially identically to the switching apparatus 640 (see FIG. 8) described above. Further, the variable inertial mass apparatus 560 according to this embodiment is configured substantially identically to the variable inertial mass apparatus 560 (see FIG. 7) described above. In the vibration reduction apparatus main body 720 according to this embodiment, the switching apparatus 640 and the variable inertial mass apparatus 560 are connected via the intermediate shaft 770, the drive gear 771, and the driven gear 772.

The intermediate shaft 770 is capable of rotating about the rotary axis X3 when power is transmitted thereto. The drive gear 771 is joined to the intermediate shaft 770 to be capable of rotating integrally therewith. The driven gear 772 is joined to the carrier 561C serving as the input element of the planetary gear mechanism 561, provided in the variable inertial mass apparatus 560, to be capable of rotating integrally therewith. The driven gear 772 has a smaller number of teeth than the drive gear 771. The drive gear 771 and the driven gear 772 mesh with each other so as to function as a speed increasing gear that increases the speed of the rotary power transmitted to the rotary body 30 from the transmission input shaft 13. Rotary power that is transmitted from the engine 4 or the drive wheels 10 to the transmission input shaft 13 and then transmitted to the intermediate shaft 770 via the switching apparatus 640 is input into (transmitted to) the carrier 561C via the drive gear 771 and the driven gear 772. At this time, the power transmitted to the carrier 561C from the intermediate shaft 770 is increased in speed in accordance with a speed ratio (a gear ratio) between the drive gear 771 and the driven gear 772, and then transmitted to the rotary body 30 side.

The reduction apparatus clutch 249 according to this embodiment is capable of switching between a condition in which the transmission input shaft 13 and the rotary body 30 are engaged to be capable of power transmission and a condition in which the engagement between the transmission input shaft 13 and the rotary body 30 is released by switching the reduction apparatus rotary shaft 15 and the intermediate shaft 770 between an engaged condition in which power can be transmitted between the reduction apparatus rotary shaft 15 and the intermediate shaft 770 and a disengaged condition in which the engagement between the reduction apparatus rotary shaft 15 and the intermediate shaft 770 is released. In this case, the rotary member 249a is a member that rotates integrally with the reduction apparatus rotary shaft 15, while the rotary member 249b is a member that rotates integrally with the intermediate shaft 770.

In the vehicle vibration reduction apparatus 701 according to the embodiment described above, the connection path (the power transmission path) between the transmission input shaft 13 and the rotary body 30 can be switched between the first path 42 and the second path 43 by the switching apparatus 640 in accordance with the condition of the vehicle 2. Hence, the vehicle vibration reduction apparatus 701 can use the single rotary body 30 separately as a resonance point adjustment apparatus and a dynamic damper, and therefore the vibration reduction performance of the apparatus can be improved while suppressing increases in the size and weight thereof. As a result, improvements in the ease with which the vehicle vibration reduction apparatus 701 is installed in the vehicle 2 as well as the fuel efficiency and the operating performance of the vehicle 2 can be achieved while reducing vibration appropriately so that comfortable travel can be realized in the vehicle 2.

Further, in the vehicle vibration reduction apparatus 701 described above, the rotary body 30, the variable inertial mass apparatus 560, and so on are capable of rotating coaxially with the rotary axis X1 of the transmission input shaft 13. In the vehicle vibration reduction apparatus 701, therefore, the vibration reduction apparatus main body 720 including the rotary body 30, the variable inertial mass apparatus 560, and so on can be appended easily to the transmission input shaft 13, enabling a further improvement in the ease with which the vehicle vibration reduction apparatus 701 is installed in the power transmission apparatus 5 of the vehicle 2.

Eighth Embodiment

Figure 10:
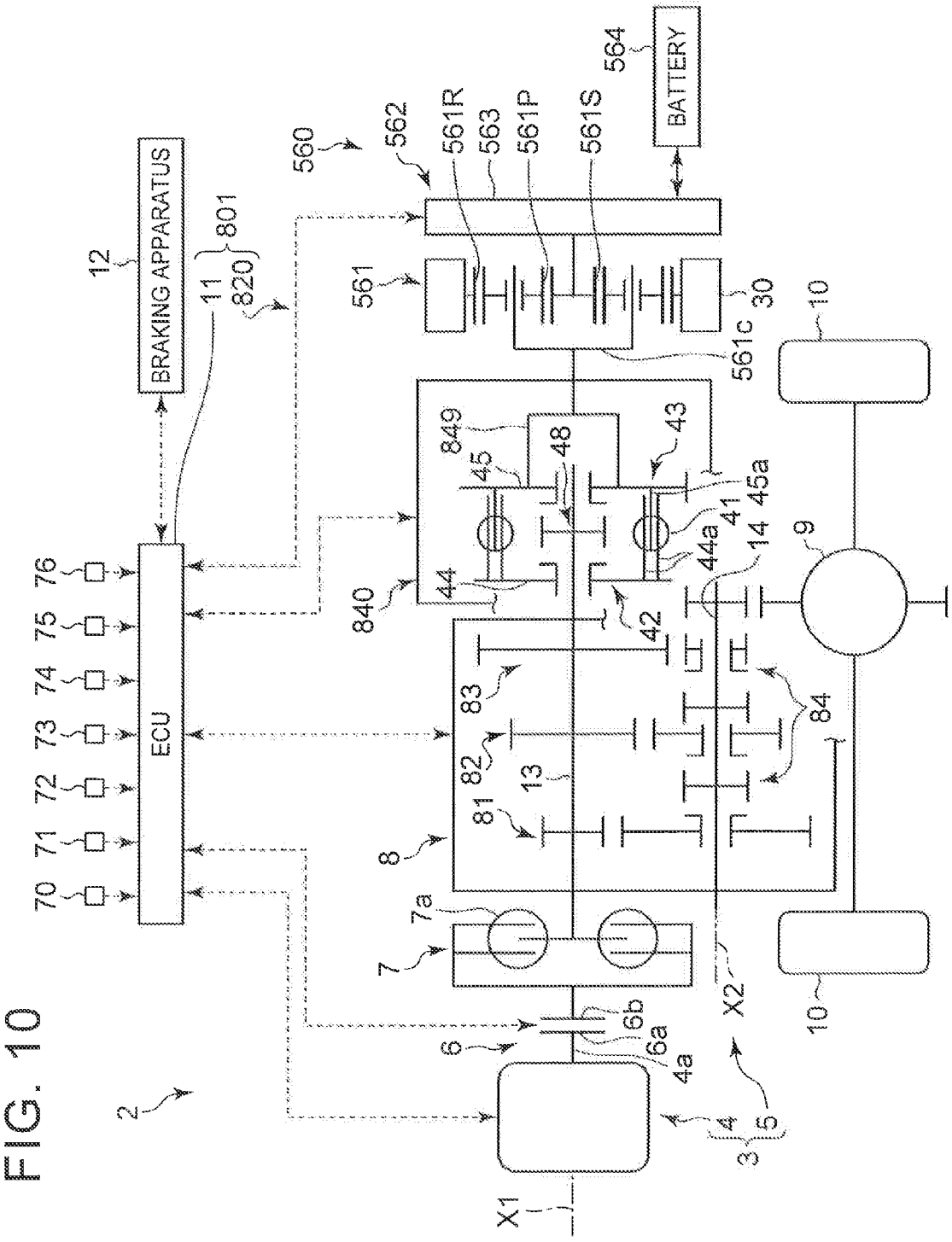
FIG. 10 is a schematic view showing a configuration of a vehicle vibration reduction apparatus according to an eighth embodiment.

FIG. 10 is a schematic view showing a configuration of a vehicle vibration reduction apparatus according to an eighth embodiment. The vehicle vibration reduction apparatus according to the eighth embodiment differs from those of the fourth, fifth, sixth, and seventh embodiments in the configurations of the switching apparatus and the variable inertial mass apparatus.

A vehicle vibration reduction apparatus 801 according to this embodiment, shown in FIG. 10, includes a vibration reduction apparatus main body 820, and the ECU 11 serving as a control apparatus that controls the vibration reduction apparatus main body 820. The vibration reduction apparatus main body 820 includes the rotary body 30, a switching apparatus 840, and the variable inertial mass apparatus 560. Here, the vibration reduction apparatus main body 820 is configured not to include the reduction apparatus rotary shaft 15 and so on (see FIG. 1). The switching apparatus 840 is capable of switching between the first path 42 and the second path 43. The variable inertial mass apparatus 560 controls the inertial mass of the rotary body 30 variably.

The switching apparatus 840 according to this embodiment includes the spring 41, the first rotary member 44, the second rotary member 45, the switch mechanism 48, and a connecting member 849. The spring 41, the first rotary member 44, the second rotary member 45, and the switch mechanism 48 are configured substantially identically to those of the switching apparatus 40 (see FIG. 1) described above. Here, however, the drive gear 46 (see FIG. 1) and the driven gear 47 (see FIG. 1) are not provided. Further, the variable inertial mass apparatus 560 according to this embodiment is configured substantially identically to the variable inertial mass apparatus 560 (see FIG. 7) described above.

The connecting member 849 of the switching apparatus 840 according to this embodiment connects the carrier 561C and the second rotary member 45 to each other to be capable of rotating integrally and coaxially about the rotary axis X1.

In this case, the first path 42 is constituted by the first rotary member 44, the first holding member 44a, the spring 41, the second holding member 45a, the second rotary member 45, and the connecting member 849. The second path 43, meanwhile, is constituted by the second rotary member 45 and the connecting member 849.

In the vehicle vibration reduction apparatus 801 according to the embodiment described above, the connection path (the power transmission path) between the transmission input shaft 13 and the rotary body 30 can be switched between the first path 42 and the second path 43 by the switching apparatus 840 in accordance with the condition of the vehicle 2. Hence, the vehicle vibration reduction apparatus 801 can use the single rotary body 30 separately as a resonance point adjustment apparatus and a dynamic damper, and therefore the vibration reduction performance of the apparatus can be improved while suppressing increases in the size and weight thereof. As a result, improvements in the ease with which the vehicle vibration reduction apparatus 801 is installed in the vehicle 2 as well as the fuel efficiency and the operating performance of the vehicle 2 can be achieved while reducing vibration appropriately so that comfortable travel can be realized in the vehicle 2.

Further, in the vehicle vibration reduction apparatus 801 described above, the entire vibration reduction apparatus main body 820 including the switching apparatus 840, and not only the rotary body 30 and the variable inertial mass apparatus 560, is capable of rotating coaxially with the rotary axis X1 of the transmission input shaft 13. Therefore, the vibration reduction apparatus main body 820 can be appended easily to the transmission input shaft 13, enabling a further improvement in the ease with which the vehicle vibration reduction apparatus 801 is installed in the power transmission apparatus 5 of the vehicle 2.

Note that the vehicle vibration reduction apparatus according to the embodiments of the invention described above is not limited to the above embodiments, and various modifications may be applied thereto within the scope of the claims. The vehicle vibration reduction apparatus according to the invention may be constructed by appropriately combining constituent elements of the respective embodiments described above.

In the above description, the vehicle vibration reduction apparatus is provided on the transmission input shaft 13 of the main transmission 8, 608 forming the drive system, but the vehicle vibration reduction apparatus may be provided on the transmission output shaft 14. In other words, the rotary body 30 serving as the inertial mass body may be connected to the transmission output shaft 14 to be capable of power transmission.

In the planetary gear mechanism described above, the carrier corresponds to an input element serving as a first rotary element, the sun gear corresponds to a rotation control element serving as a second rotary element, and the ring gear corresponds to a mass element serving as a third rotary element. The invention is not limited thereto, however, and for example, the planetary gear mechanism may be configured such that the ring gear corresponds to the input element serving as the first rotary element, the carrier corresponds to the rotation control element serving as the second rotary element, and the sun gear corresponds to the mass element serving as the third rotary element. Other combinations may also be employed.

In the above description, the planetary gear mechanism is a single pinion type planetary gear mechanism, but the planetary gear mechanism is not limited thereto and may be a double pinion type planetary gear mechanism instead.

The rotation control apparatus described above is configured to include a rotating electric machine (the motor 563). The invention is not limited thereto, however, and as long as rotation of a rotary element of a planetary gear mechanism constituting a rotating mass body can be controlled such that the apparent inertial mass of the rotating mass body can be varied, the rotation control apparatus may be configured to include an electromagnetic brake apparatus or the like, for example.

The vehicle described above may be a so-called "hybrid vehicle" that includes a motor/generator or the like constituting a chargeable motor as a travel power source in addition to an internal combustion engine.

1, 201, 301, 401, 501, 601, 701, 801 vehicle vibration reduction apparatus
2 vehicle
3 power train
4 engine (travel drive source)
5 power transmission apparatus
6 clutch
7 damper
8, 608 main transmission
9 differential gear
10 drive wheel
11 ECU (control apparatus)
13 transmission input shaft (rotary shaft)
14 transmission output shaft
15 reduction apparatus rotary shaft
20, 220, 320, 420, 520, 620, 720, 820 vibration reduction apparatus main body
30 rotary body (inertial mass body)
40, 240, 340, 440, 540, 640, 840 switching apparatus
41 spring (elastic body)
42 first path
43 second path
48, 348, 448, 449, 548 switch mechanism (connection releasing mechanism)
249 reduction apparatus clutch (connection releasing mechanism)

460, 560, 660 variable inertial mass apparatus
561 planetary gear mechanism
562 rotation control apparatus
563 motor
564 battery
661 CVT
770 intermediate shaft
771 drive gear
772 driven gear
849 connecting member

The invention claimed is:

1. A vehicle vibration reduction apparatus comprising:
an inertial mass body that is connected to a rotary shaft of a power transmission apparatus such that the inertial mass body is capable of power transmission, wherein the power transmission apparatus is capable of transmitting rotary power from a travel drive source to a drive wheel of a vehicle, the inertial mass body being provided parallel to a power transmission path of the power transmission apparatus extending from the travel drive source to the drive wheel; and
a switching apparatus that is provided on the power transmission path between the rotary shaft and the inertial mass body and that is capable of switching between a first path on which the rotary shaft and the inertial mass body are connected to each other via an elastic body, and a second path on which the rotary shaft and the inertial mass body are connected to each other without passing through the elastic body.

2. The vehicle vibration reduction apparatus according to claim 1, wherein the switching apparatus includes a connection releasing mechanism that is capable of releasing a connection between the rotary shaft and the inertial mass body.

3. The vehicle vibration reduction apparatus according to claim 1, wherein the switching apparatus is capable of speed-shifting the rotary power transmitted to the inertial mass body on the first path or the second path at a plurality of speed ratios.

4. The vehicle vibration reduction apparatus according to claim 1, further comprising a variable inertial mass apparatus that controls an inertial mass of the inertial mass body variably.

5. The vehicle vibration reduction apparatus according to claim 1, wherein the inertial mass body is capable of rotating coaxially with a rotary axis of the rotary shaft.

6. The vehicle vibration reduction apparatus according to claim 1, further comprising a control apparatus that controls switching between the first path and the second path by controlling the switching apparatus on the basis of an output rotation speed of the travel drive source.

* * * * *